(12) United States Patent  
Appleyard

(10) Patent No.: US 9,396,162 B2  
(45) Date of Patent: Jul. 19, 2016

(54) METHOD AND APPARATUS FOR ESTIMATING THE STATE OF A SYSTEM

(76) Inventor: John Appleyard, Standlake (GB)

( * ) Notice: Subject to any disclaimer, the term of this patent is extended or adjusted under 35 U.S.C. 154(b) by 382 days.

(21) Appl. No.: 13/189,149

(22) Filed: Jul. 22, 2011

(65) Prior Publication Data

US 2012/0022841 A1    Jan. 26, 2012

Related U.S. Application Data

(60) Provisional application No. 61/366,625, filed on Jul. 22, 2010.

(51) Int. Cl.
| | |
|---|---|
| G06F 17/12 | (2006.01) |
| G06F 17/10 | (2006.01) |
| G06F 17/11 | (2006.01) |
| G01V 99/00 | (2009.01) |

(52) U.S. Cl.
CPC .............. *G06F 17/12* (2013.01); *G01V 99/005* (2013.01)

(58) Field of Classification Search
None
See application file for complete search history.

(56) References Cited

U.S. PATENT DOCUMENTS

2009/0138245 A1    5/2009    Appleyard

OTHER PUBLICATIONS

Crumpton, P.A. et al., "Parallel computing Using ECLIPSE Parallel", Schlumberger Information Solutions (2003).*
Authors Unknown, Graph Coloring, Wikipedia, as archived on Jul. 8, 2009.*
William D. Gropp, Parallel Computing and Domain Decomposition, Fifth International Symposium on Domain Decomposition Methods for Partial Differential Equations, Tony F. Chan, David E. Keyes, Gérard A. Meurant, Jeffrey S. Scroggs, and Robert G. Voigt, 1992.*
Wallis, J.R.,Foster, J.A.and Kendall, R.P. : "A New Parallel Linear Iterative Solution Method for Large-Scale Reservoir Simulation", paper SPE 21209 presented at the 11th SPE Symposium on Reservoir Simulation, (1991) 83-92.*
Heuveline, V. et al., "Enhanced ParallelILU(p)-based Preconditioners for Multi-core CPUs and GPUs—The Power(q)-pattern Method", PreQrint Series of the Engineering Mathematics and ComQuting Lab (EMCL)ISSN 2191-0693 No. 2011-08, available at httQ://www.emcl.kit.edu/QreQrints/emcl-QreQrint-2011-08.pdf (2011).*
Crumpton, P.l. et al., "Parallel Computing Using a Commercial Reservoir Simulator", paper presented at ECMOR VIII Sep. 3-6, 2002.*
Richard Burrows, et al., "Parallel Reservoir Simulation with Nested Factorisation", 5.sup.th European Conference on the Mathematics of Oil Recovery, Leoben, Austria, Sep. 3-6, 1996, pp. 19-37.*
Crumpton, P. I., P. A. Fjerstad, and J. Berge, "Parallel Computing Using a Commercial Reservoir Simulator", 8th European Conference on the Mathematics of Oil Recovery, 2002, pp. 1-8.*
John E. Killough, Domi~ic Camilleri, Bruce L. Darlow, and John A. Foster, A Parallel Reservoir Simulator Based on Local Grid Refinement, SPE Reservoir Simulation Symposium, SPE 37978, 1997, pp. 39-53.*

(Continued)

*Primary Examiner* — Omar Fernandez Rivas
*Assistant Examiner* — Robert Brock
(74) *Attorney, Agent, or Firm* — Timberline Patent Law Group

(57) ABSTRACT

Disclosed herein are methods, apparatuses, and techniques for estimating the state of a system. According to one implementation, a Massively Parallel Nested Factorization technique, or MPNF, is disclosed that runs efficiently on parallel computer architectures. Also disclosed is a procedure used to create and utilize MPNF ordering.

15 Claims, 21 Drawing Sheets

(56) References Cited

OTHER PUBLICATIONS

Saad, Yousef "Iterative Methods for Sparse Linear Systems", Second Edition, published by SIAM, ISBN 0-89871-534-2, (2003).
Wallis, J.R. et al., "Constrained Residual Acceleration of Conjugate Residual Methods", *SPE13536, presented at the SPE Symposium on Reservoir Simulation*, Houston, TX, Feb. 10-13, 1985.
Appleyard, J.R. et al., "Special techniques for fully-implicit simulators", *In Proc. European Symposium on Enhanced Oil Recovery Bournemouth, UK*, (1981),395-408.
Appleyard, J.R. et al., "Nested factorization", *In Seventh SPE Symposium on Reservoir Simulation*, paper No. 12264, (1983),pp. 315-324.
Kumar, P. et al., "Combinative preconditioning based on Relaxed Nested Factorization and Tangential Filtering preconditioner", *INRIA Rapport de recherche*, ISSN 0249-6399, (2009).
Kuznetsova, N.N. et al., "The Family of Nested Factorizations", *Russ J Numer. Anal. Math. Modelling*, vol. 22 . No. 4, (2007),pp. 393-412.
Van Der Vorst, H. "Large tridiagonal and block tridiagonal linear systems on vector and parallel computers", *Parallel Computing* vol. 5, (1987),pp. 45-54.
Scheichl, R. et al., "Decoupling and Block Preconditioning for Sedimentary Basin Simulations", *Computational Geosciences*, vol. 7, (2003),pp. 295-318.
Appleyard, J.R. "The Summation of Pinning Forces in Type II Superconductors", *A Dissertation Submitted for the Degree of Doctor of Philosophy in the University of Cambridge*, (Feb. 1975),21 pages.

* cited by examiner

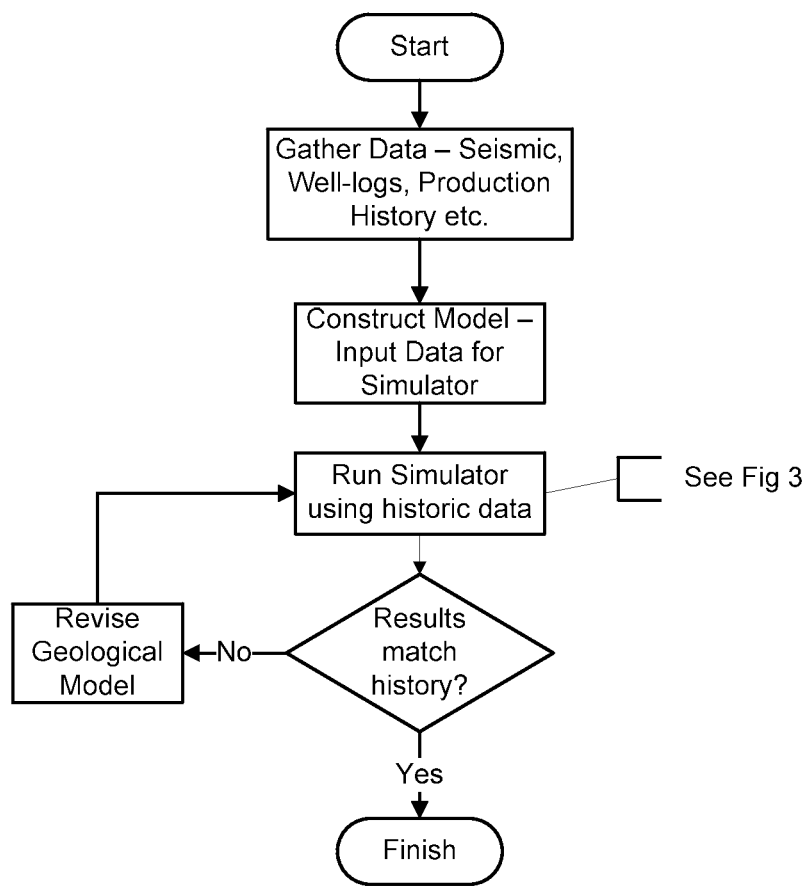
Figure 1: History Matching

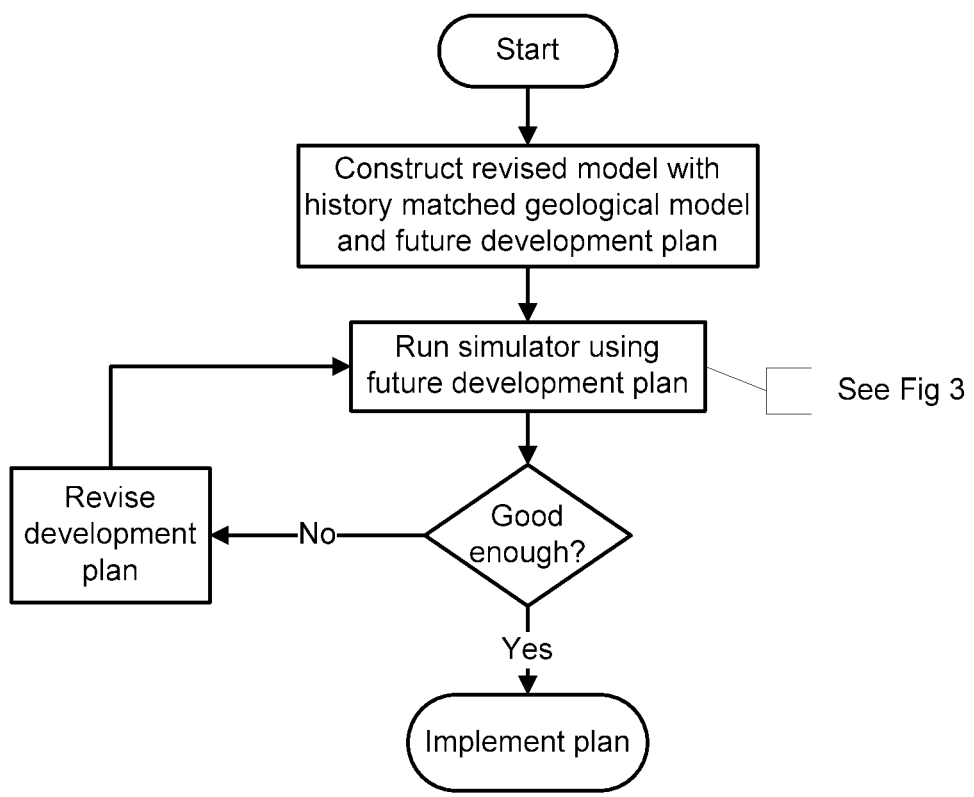
Figure 2: Prediction (Develop plan)

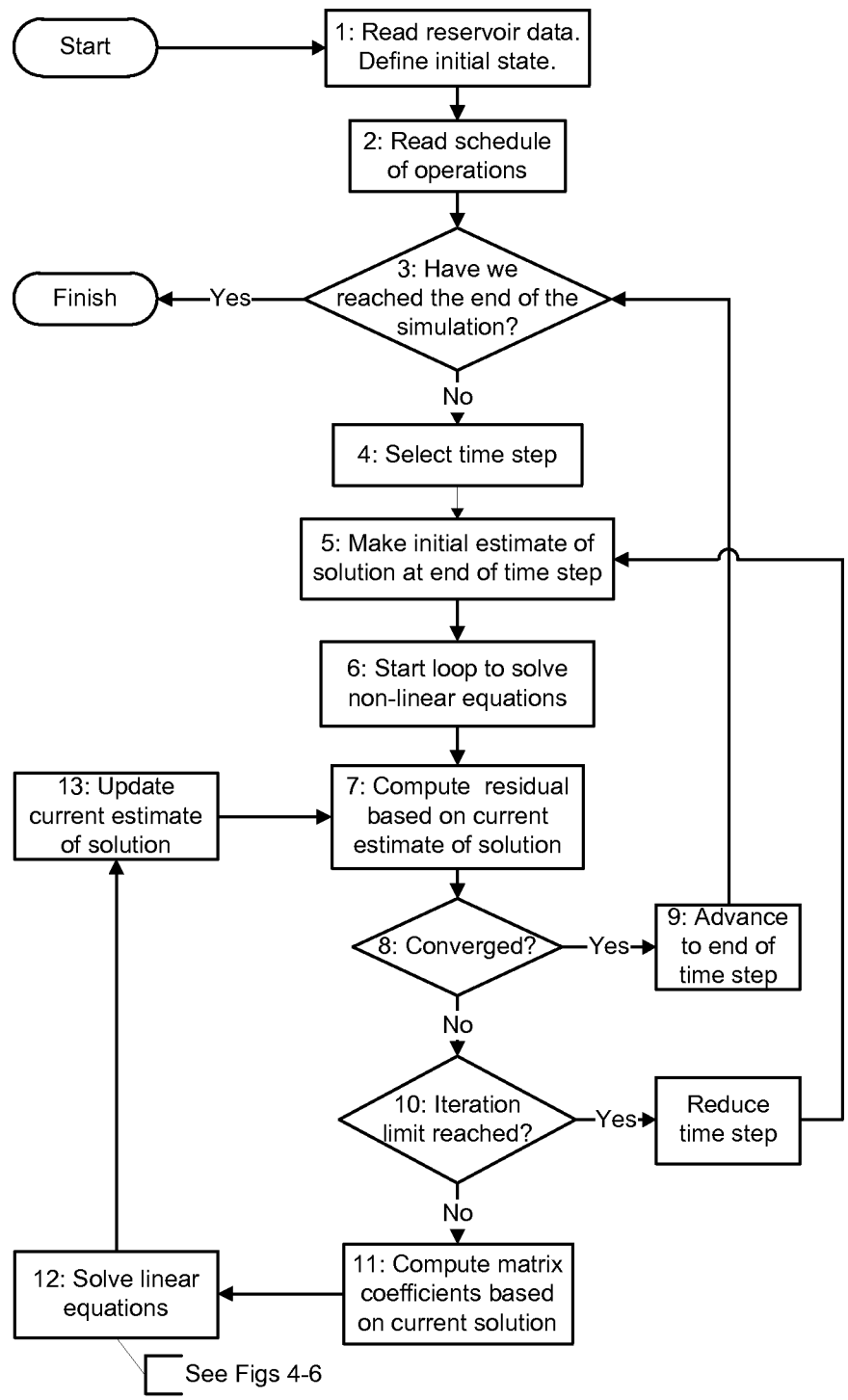
Figure 3: Reservoir Simulation

Figure 4: Solve Linear Equations (Setup)
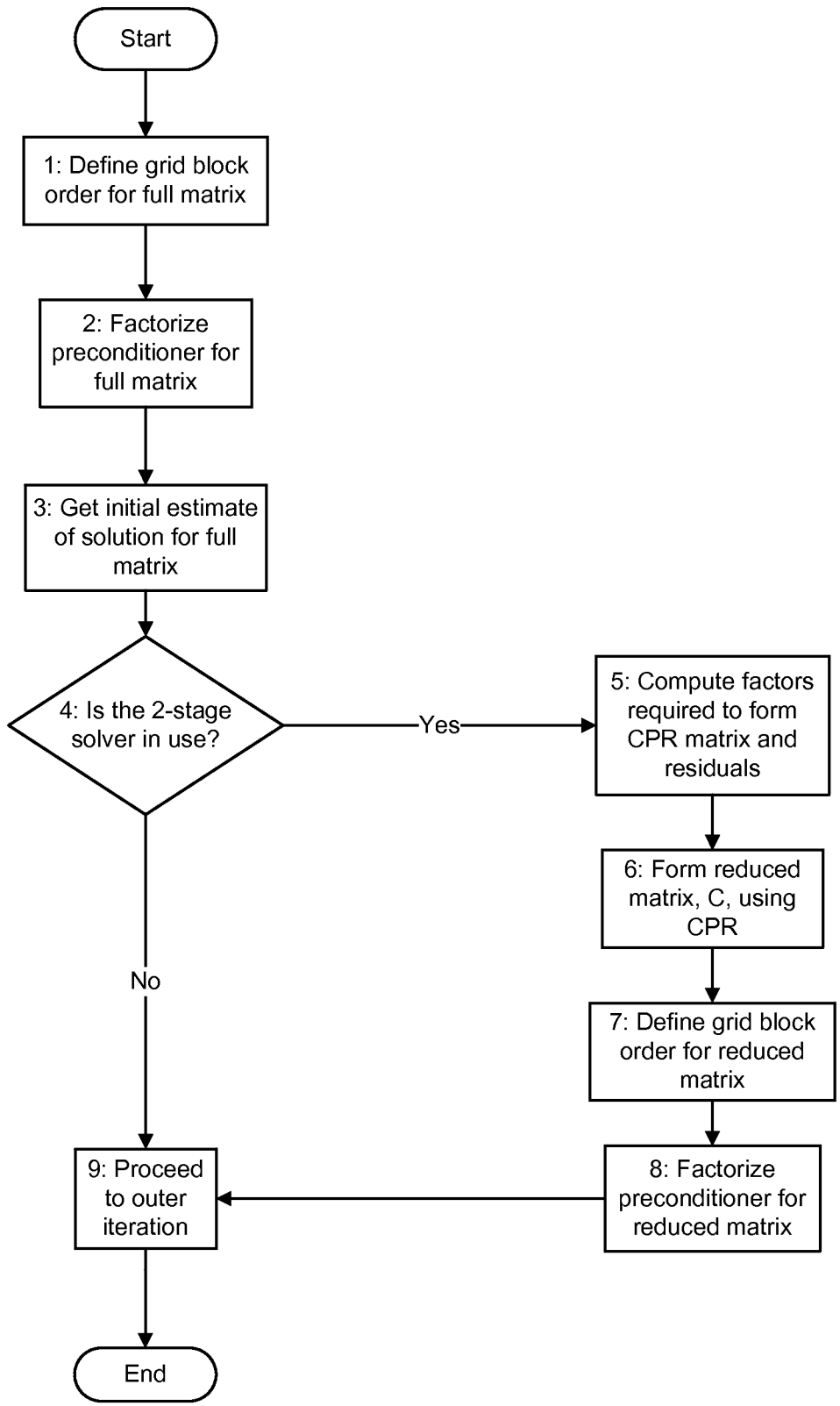

Figure 5: Solve Linear Equations (Outer Iteration)
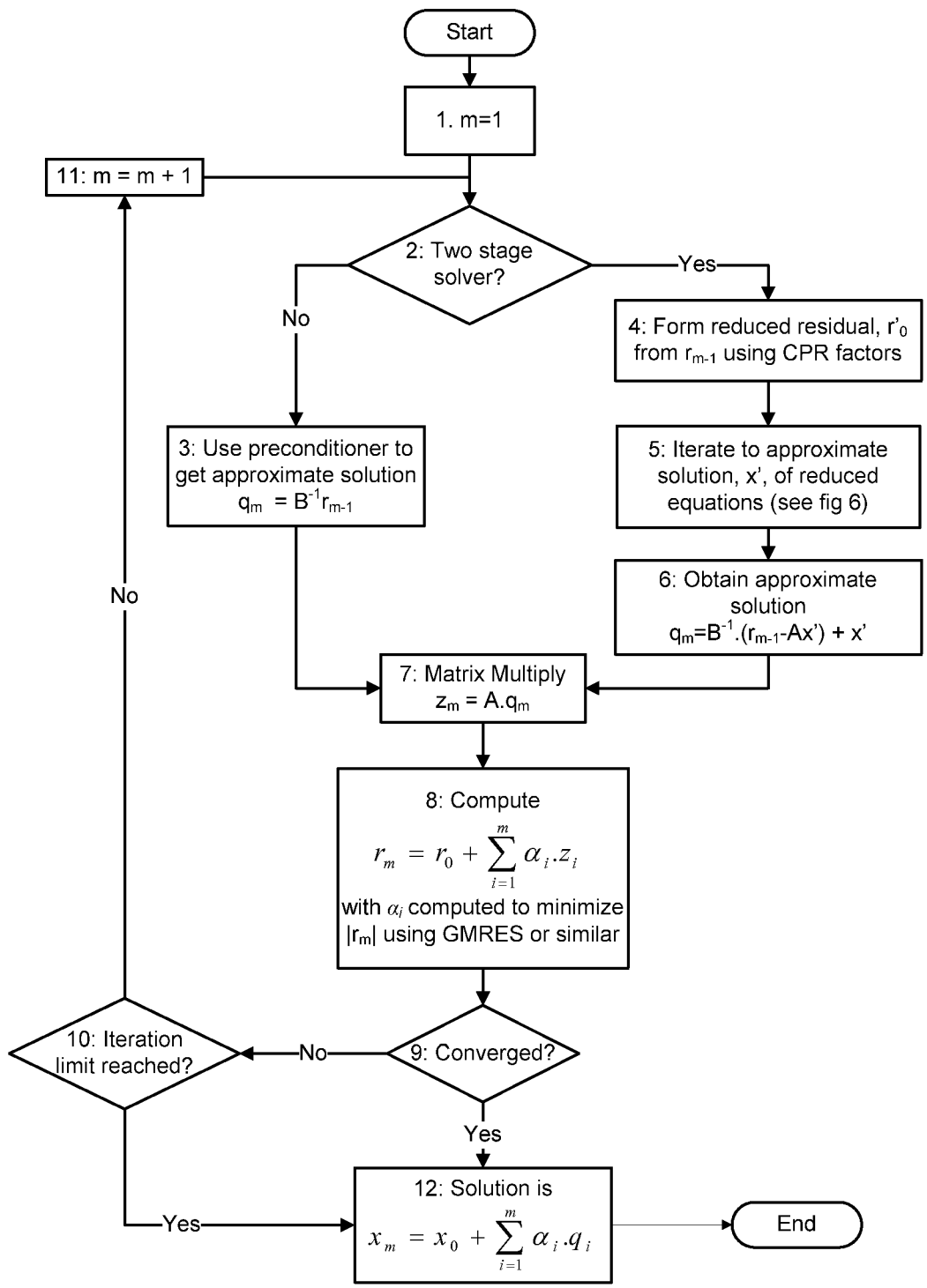

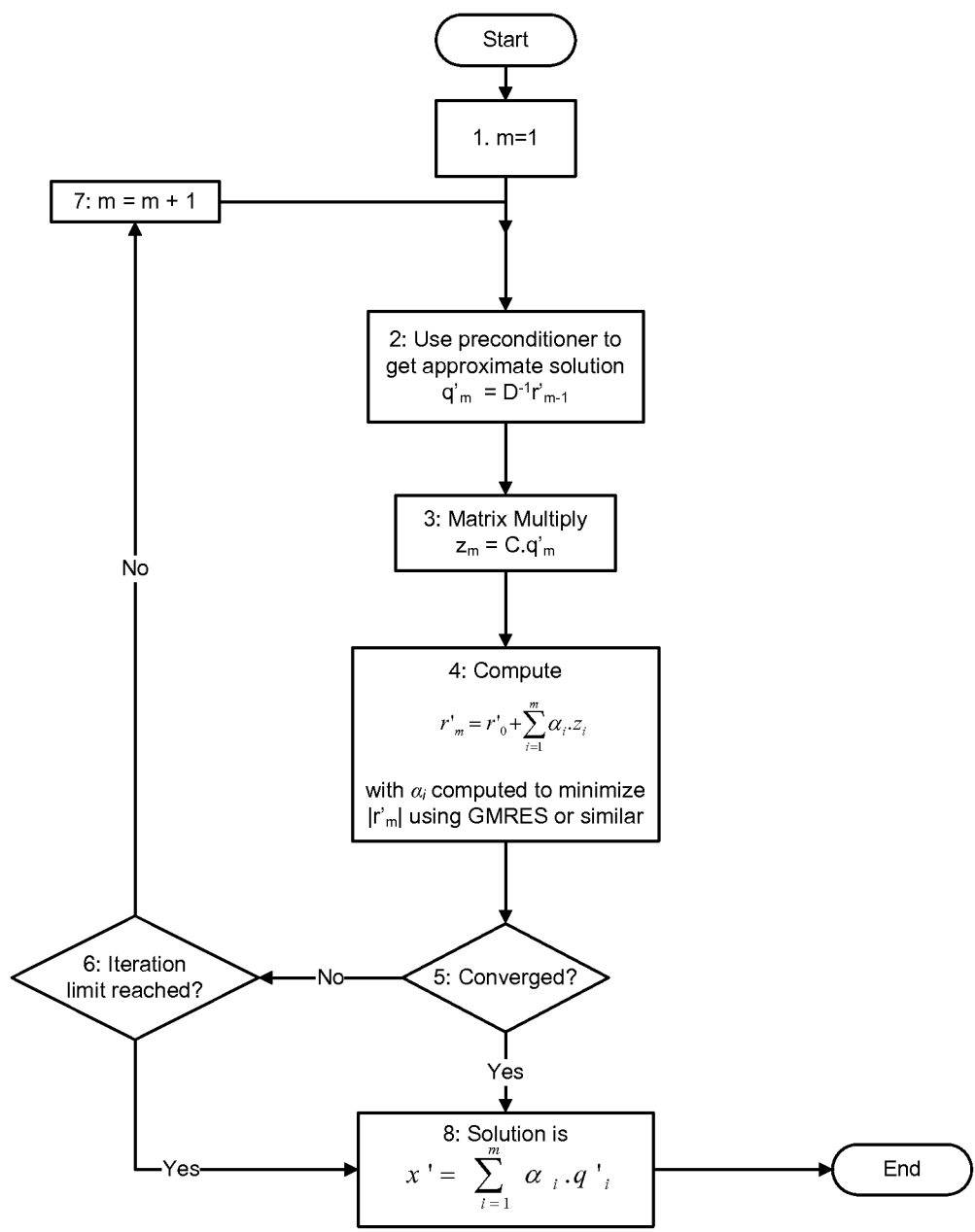
Figure 6: Solve Linear Equations (Inner Iteration)

Figure 7 – A 4x4x2 Rectangular Grid – NF ordering
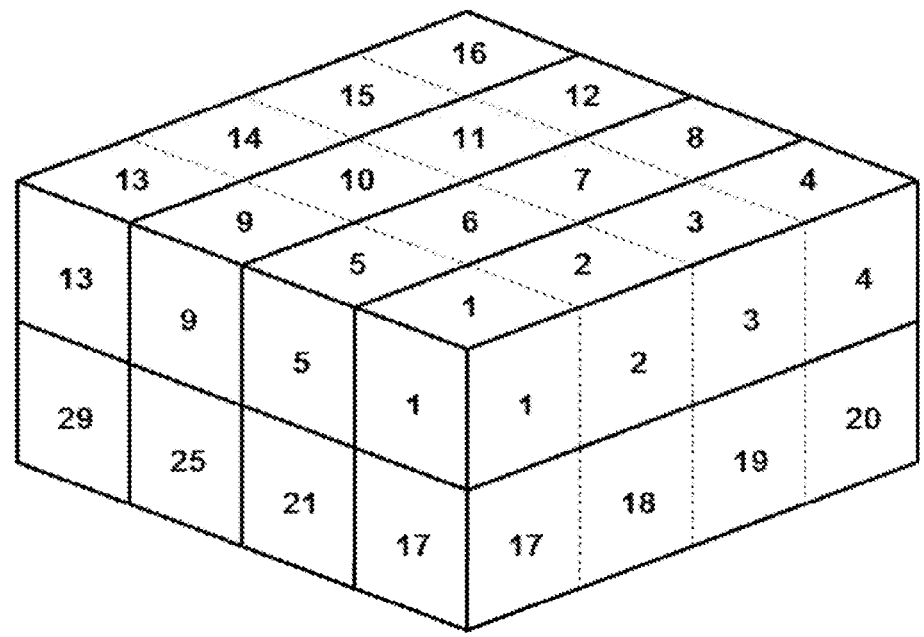

Figure 8 – Matrix Structure for a 4x4x2 Rectangular Grid
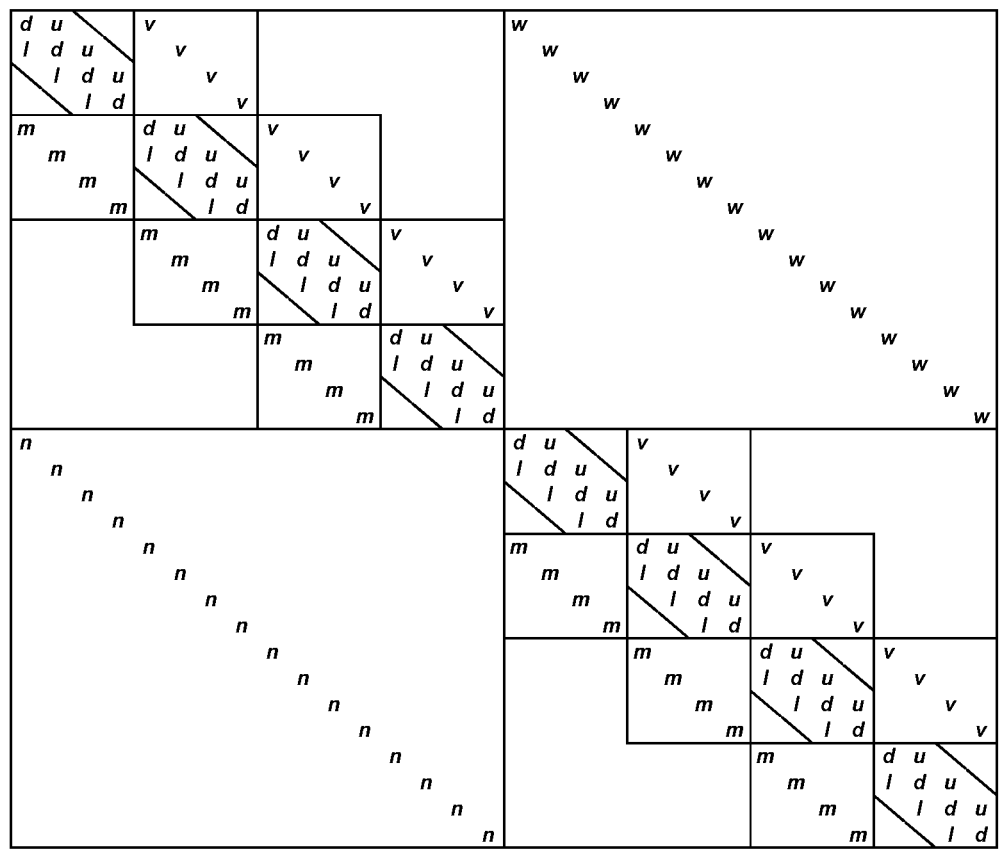

Figure 9: 6x6x4 Grid with Natural Ordering
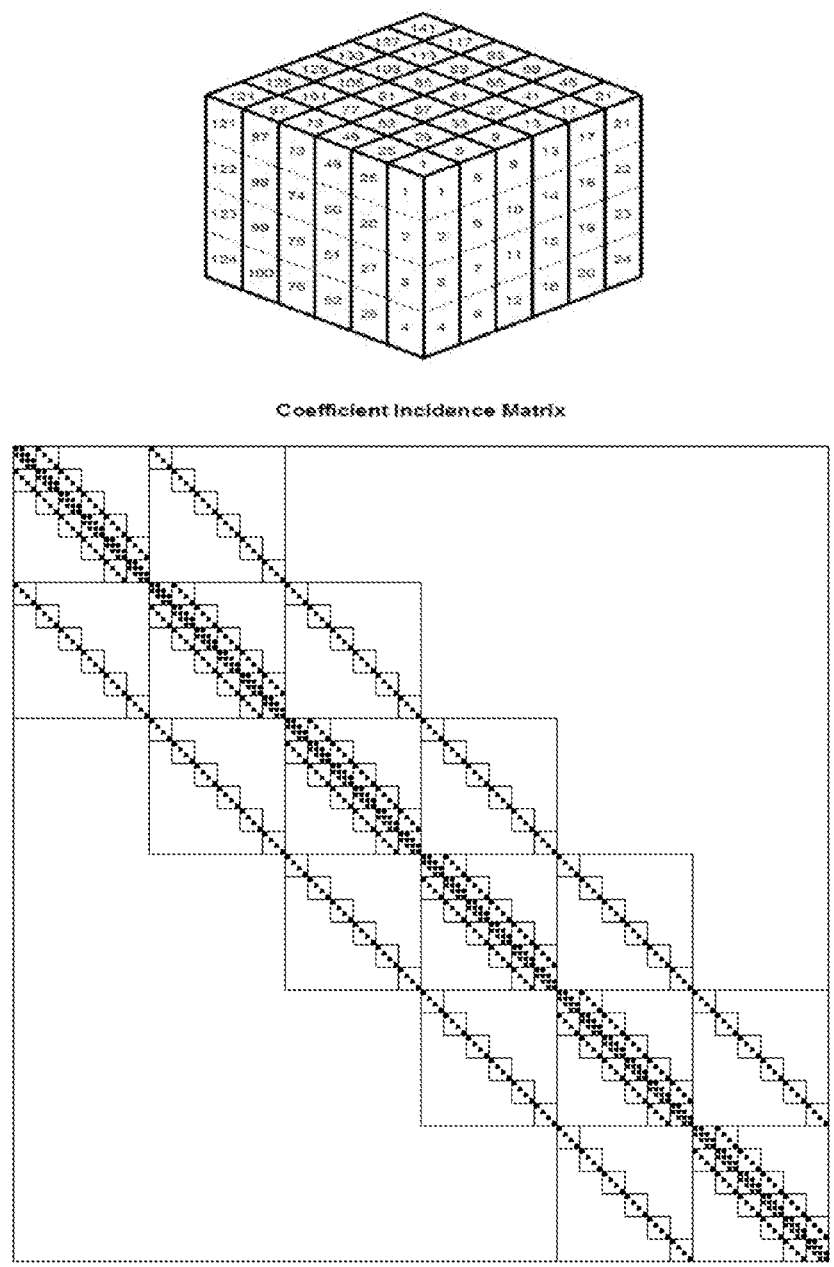

Figure 10: 6x6x4 Grid with 2-Color Chequerboard Ordering
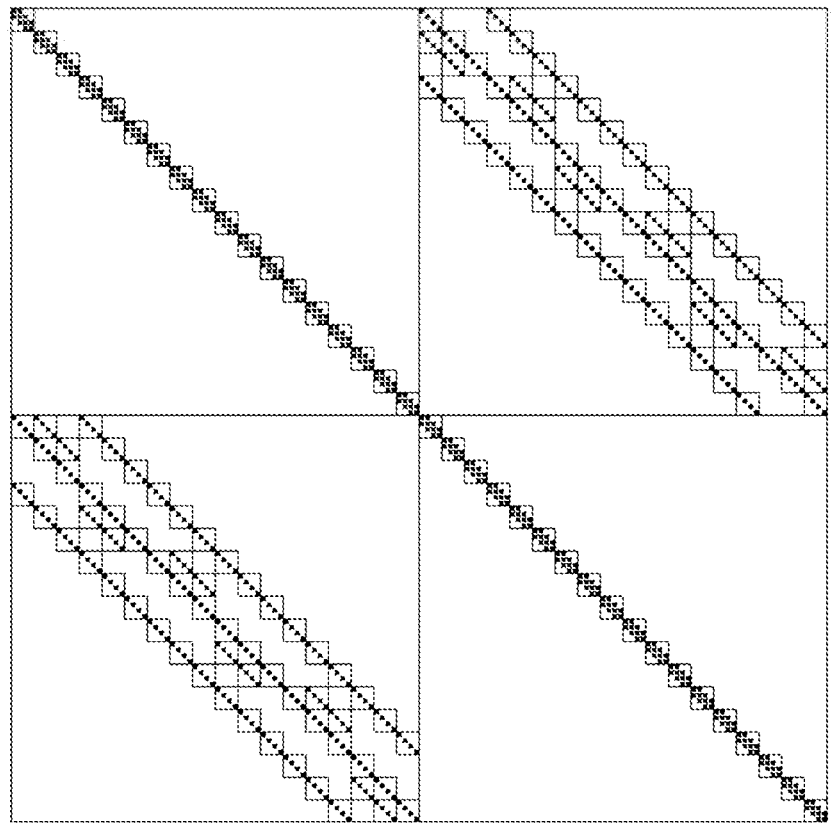

Figure 11: 6x6x4 Grid with 3 Color Oscillatory Ordering
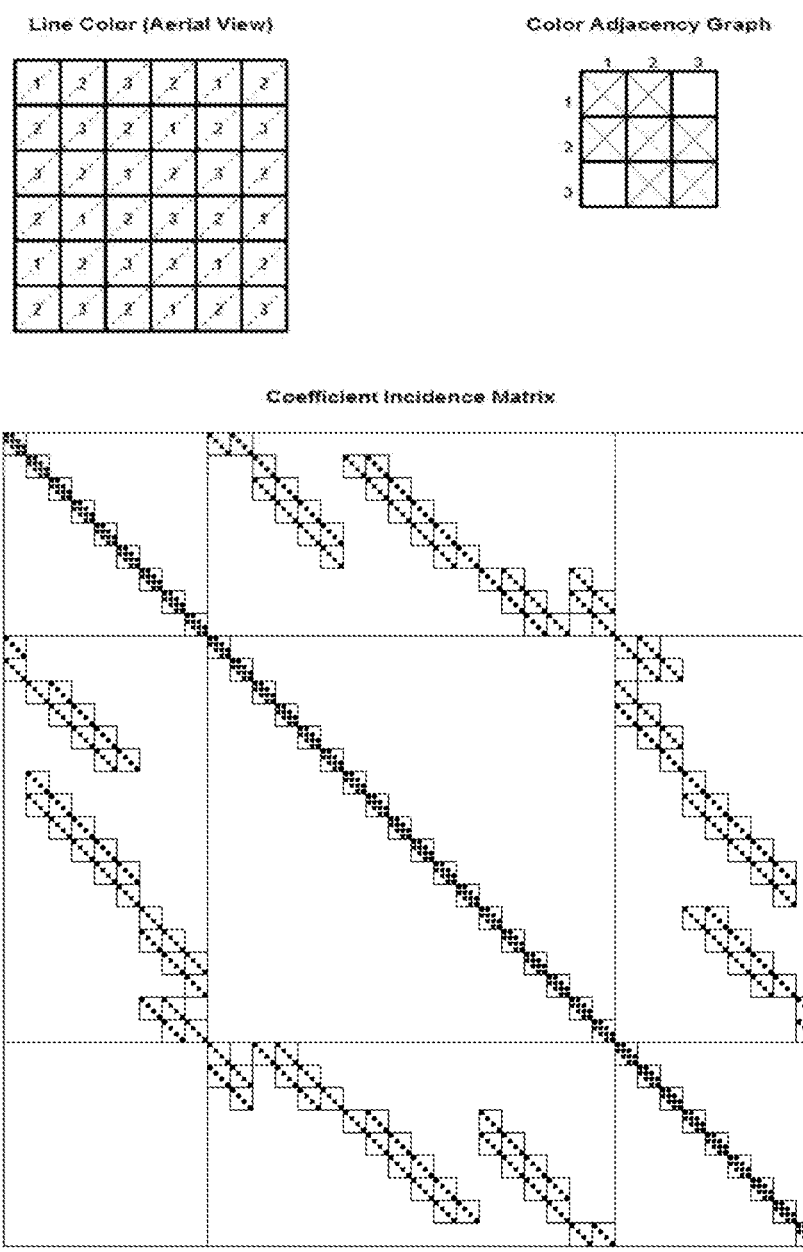

Figure 12: 6x6x4 Grid with 4 Color Oscillatory Ordering
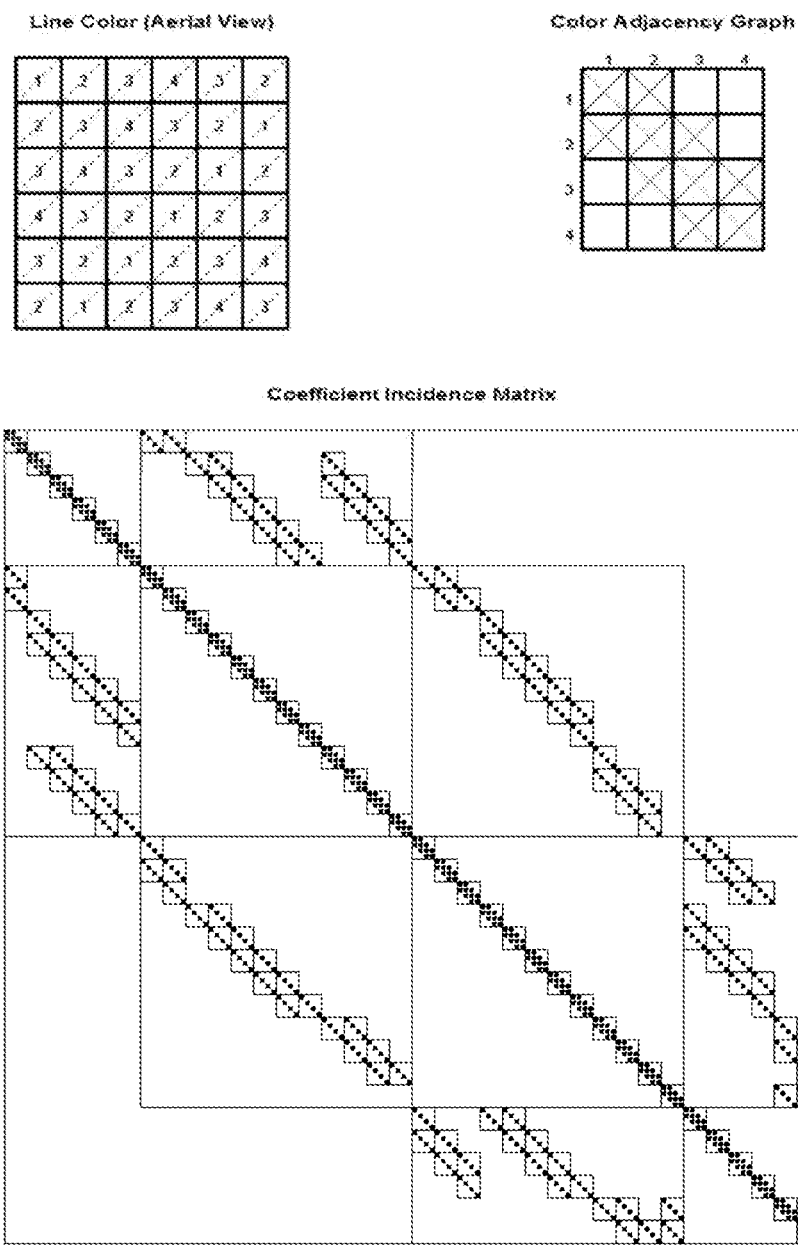

Figure 13: 6x6x4 Grid with Alternative 4 Color Oscillatory Ordering
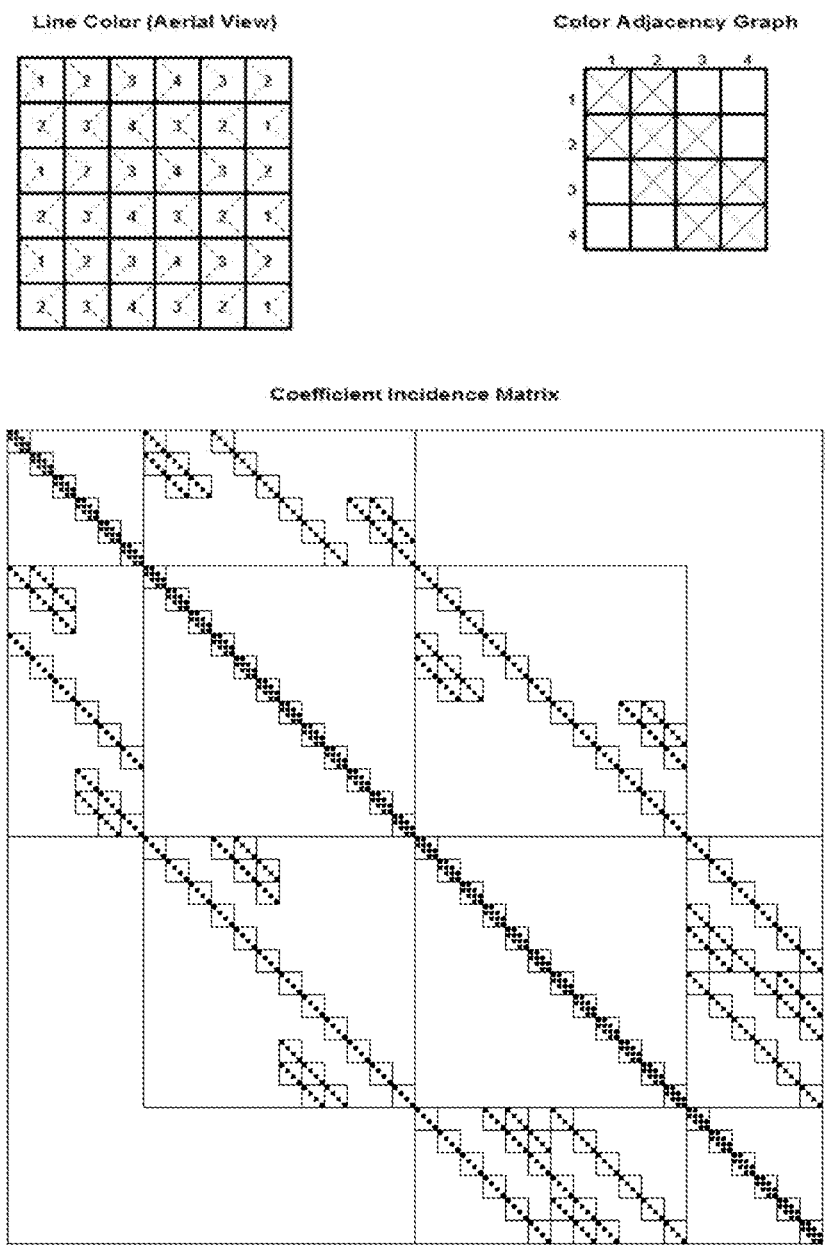

Figure 14: 6x6x4 Grid with 4 Color Cyclical Ordering
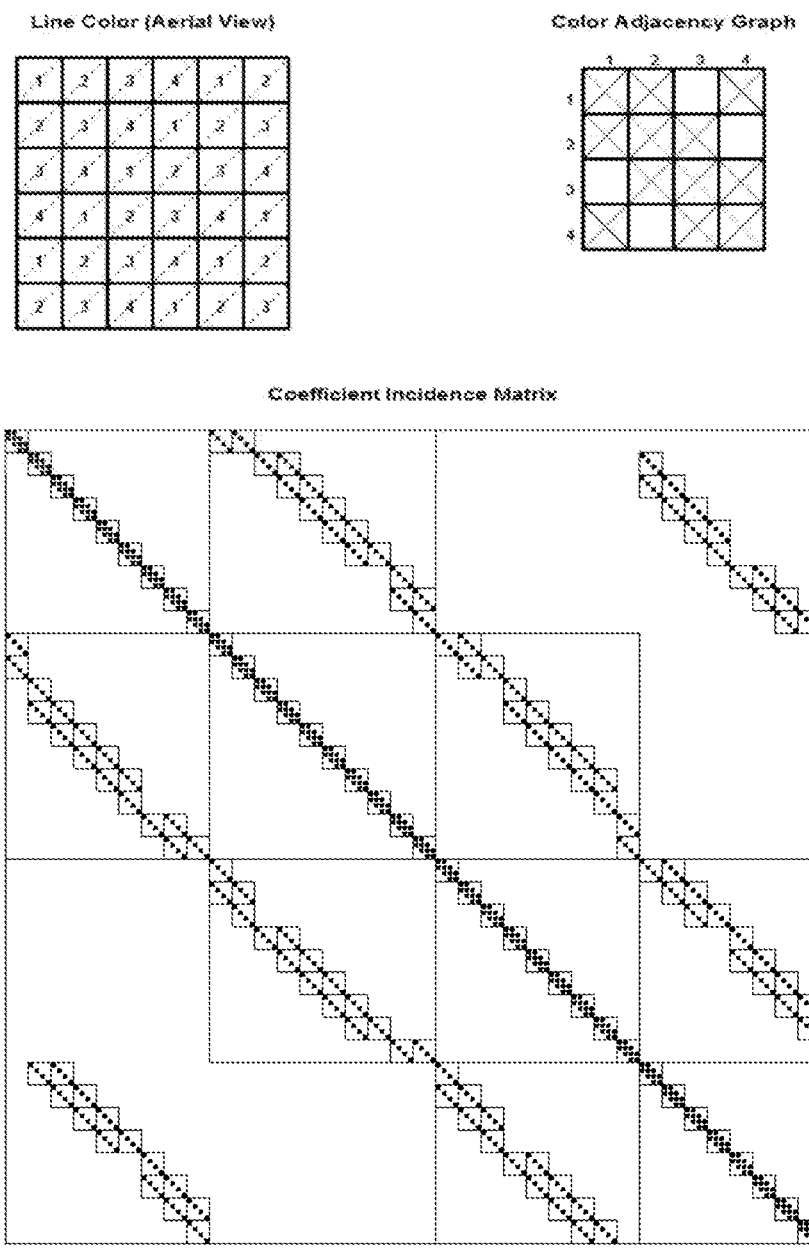

Figure 15: Aerial View of Prismatic Grid
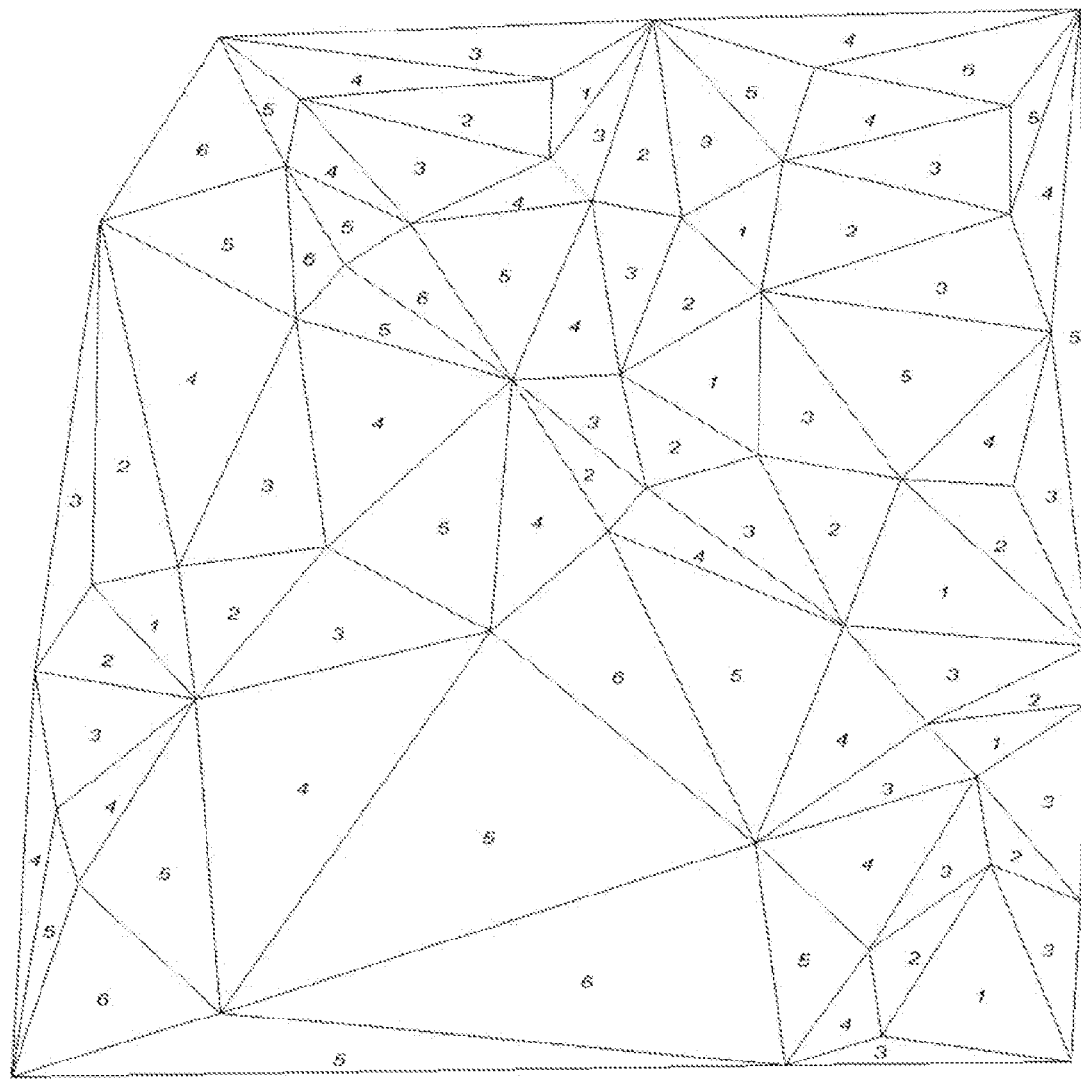

Figure 16: Coefficient Incidence Matrix for Prismatic Grid
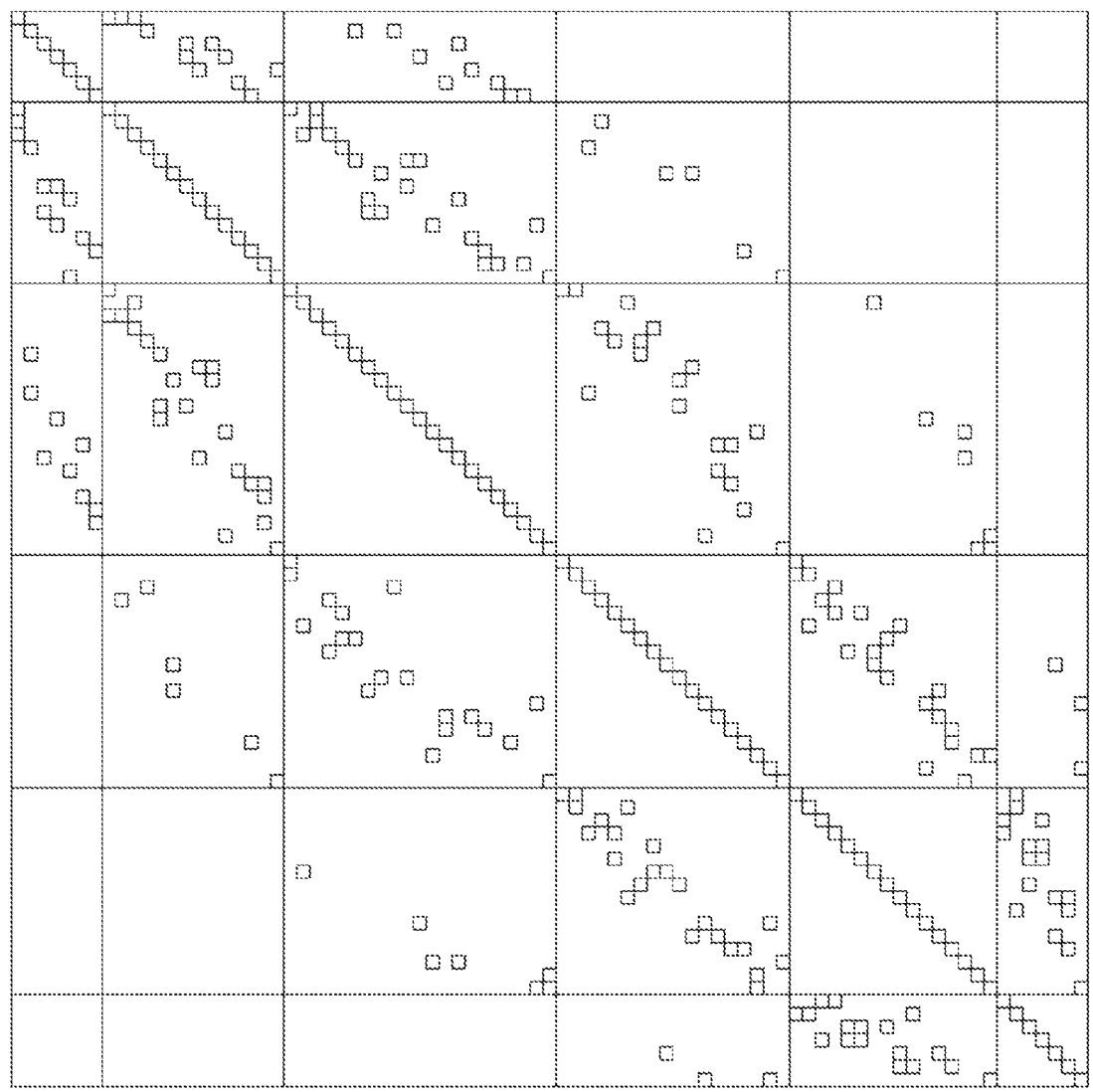

Figure 17: 6x6x4 Grid with 4 Color 2 Line Oscillatory Ordering
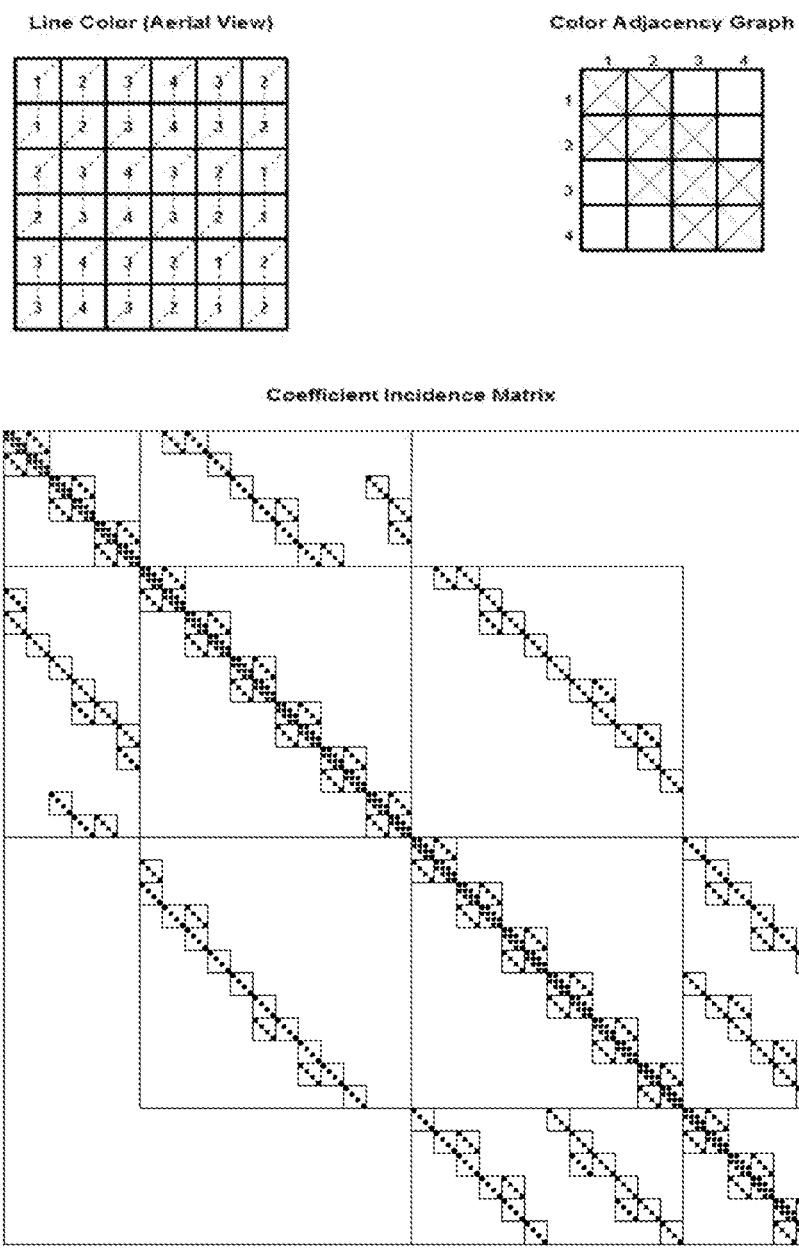

Figure 18: MPNF Ordering Procedure
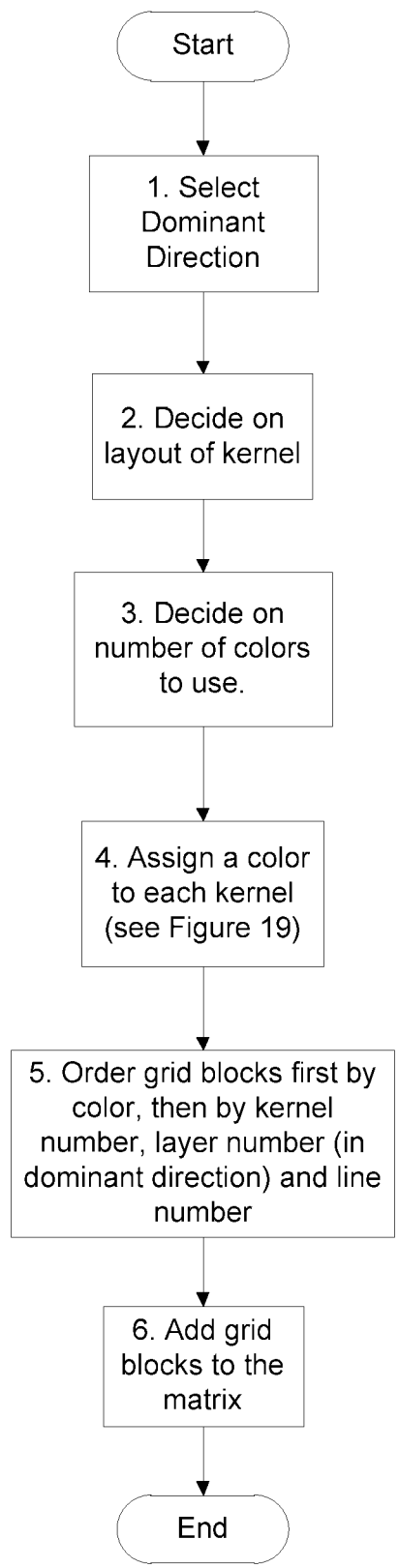

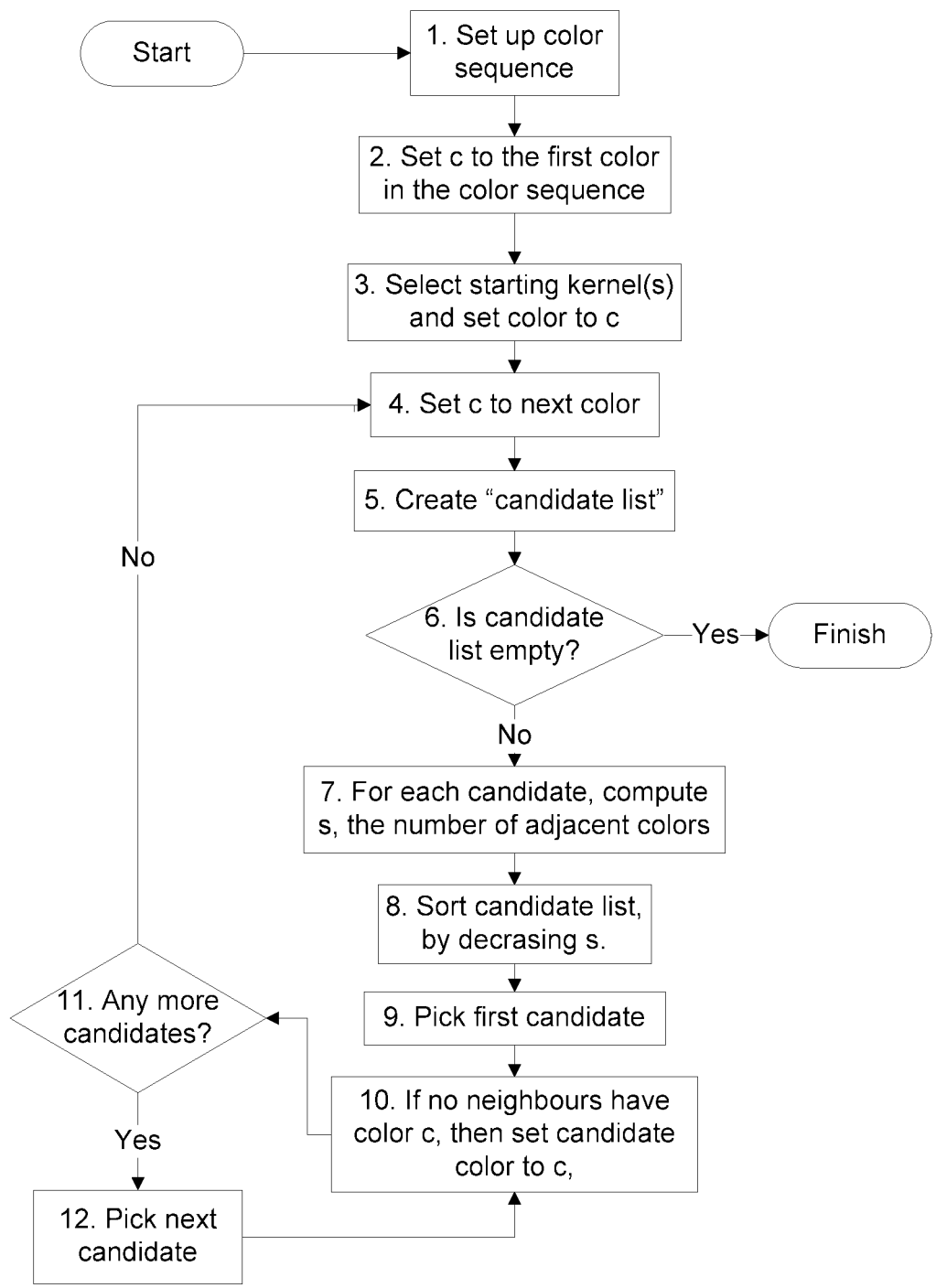
Figure 19: Kernel Color Assignment

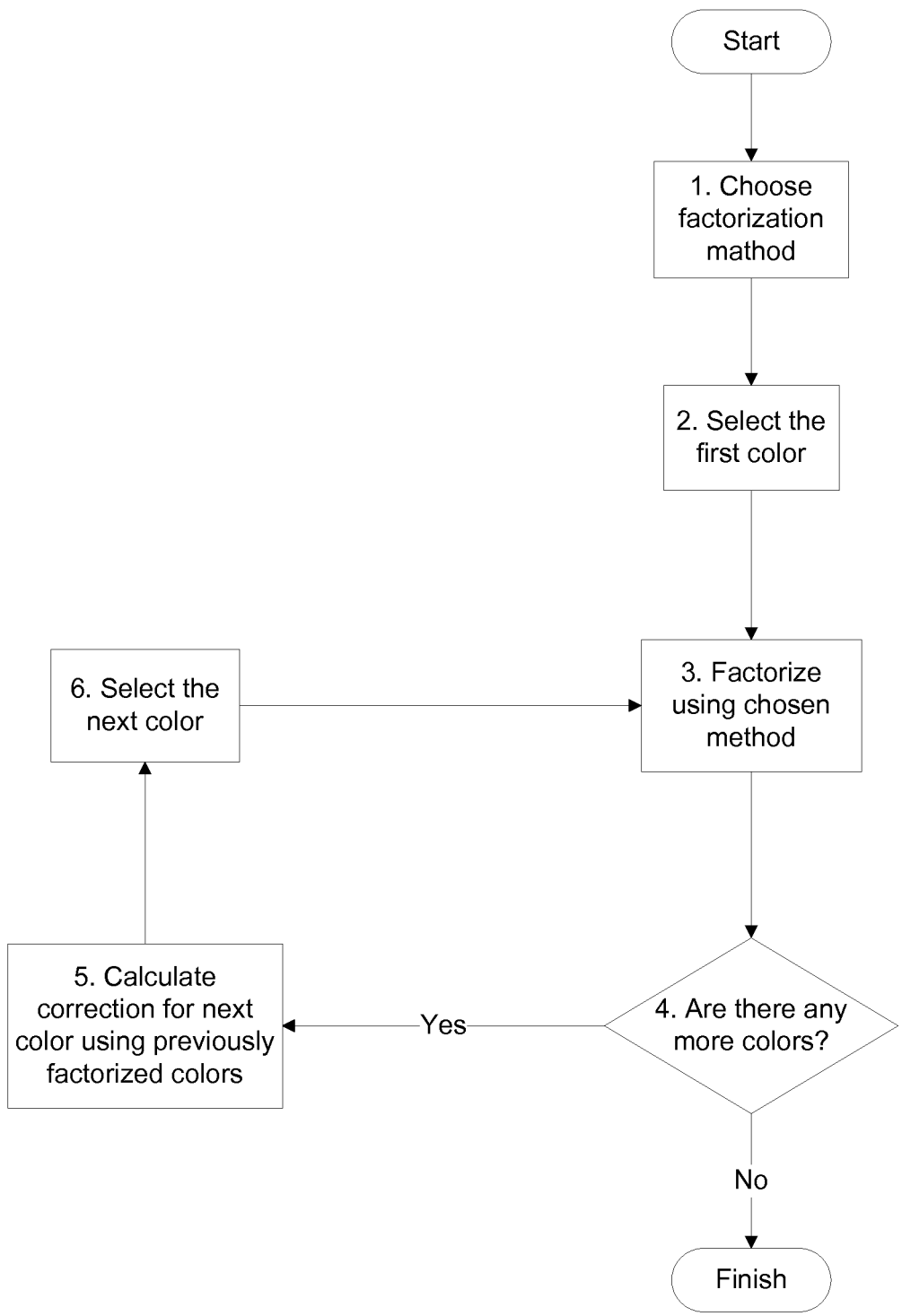
Figure 20: MPNF Factorization

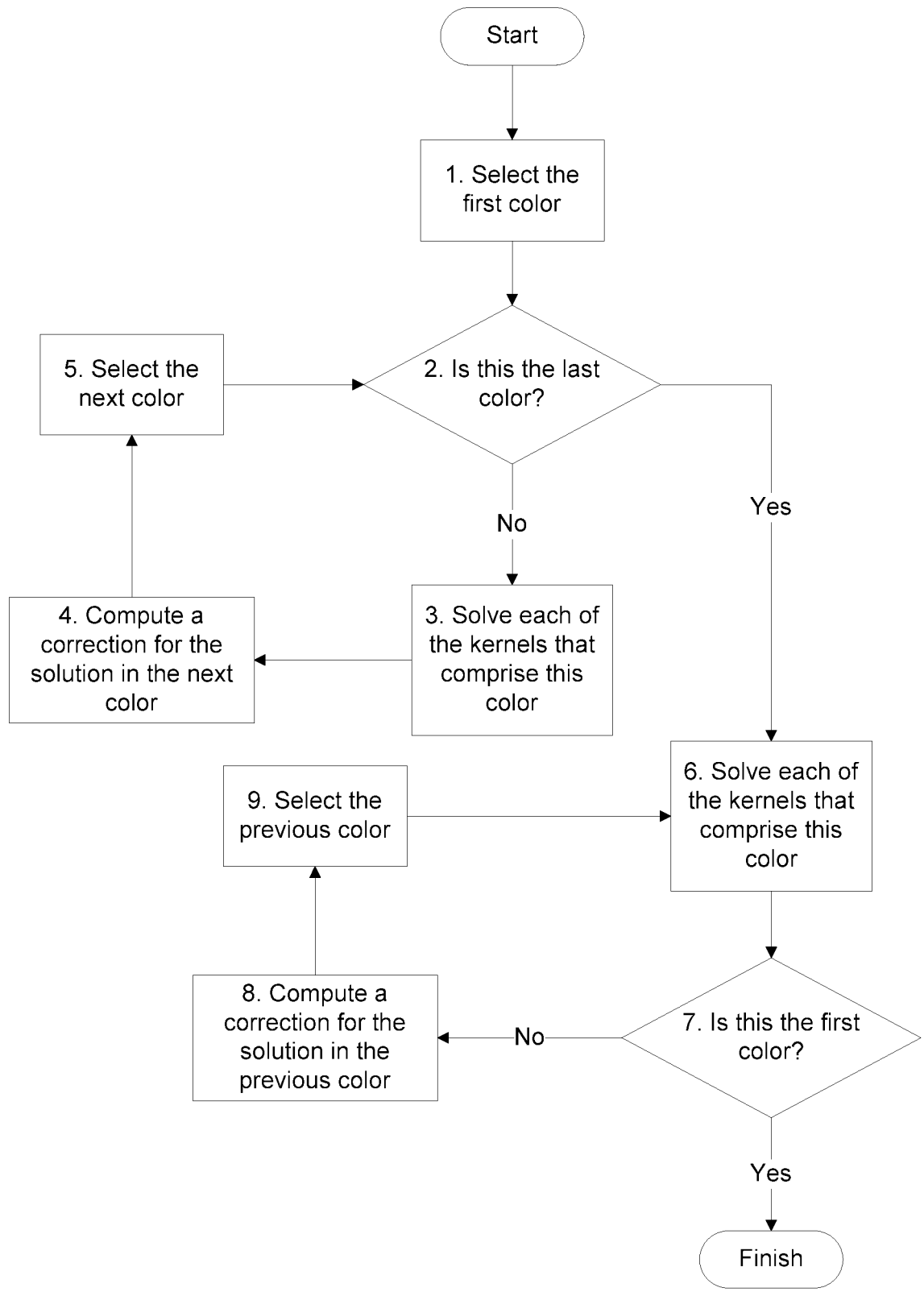
Figure 21: MPNF Solution Procedure

METHOD AND APPARATUS FOR ESTIMATING THE STATE OF A SYSTEM

TECHNICAL FIELD

The present invention relates to a method and apparatus for estimating the state of a system.

BACKGROUND

In many areas of science and engineering, complex problems, such as physical problems, are solved using mathematical models which are discretized over space. Various methods can be used to convert a continuous mathematical model into a discretized form, the most common being the Finite Difference, Finite Element and Finite Volume methods.

The finite volume method is commonly used in Computational Fluid Dynamics applications, and in related fields such as Oil Reservoir Simulation. This method splits a problem domain into grid blocks (cells) by superimposing a mesh or grid of some type. Fluid conservation equations are then constructed by considering the accumulation of fluids within a cell, and flow across the cell faces to neighbouring cells, or to external sinks or sources, such as oil wells. Mass accumulation and flow rates depend on fluid properties such as the pressure, temperature and composition in each grid block and its neighbours. For time varying problems, the model is advanced through time by finding the values of the fluid properties that simultaneously satisfy the conservation equations in every cell for each discrete time-step.

In general these equations are non-linear, and Newton's method (or similar) is used to reduce the problem to the repeated solution of simultaneous linear equations linking all the grid blocks.

Similar considerations apply to other space discretization methods: for example, a finite difference method with a seven-point stencil may be approached using solution techniques which are the same as those described here.

For small problems, direct solution methods, such as Gaussian elimination or Cholesky decomposition can be used to solve the linear equations. However, direct methods become prohibitively expensive in terms of both storage and computing time for larger problems, and iterative methods are the norm for this type of problem.

Many common methods for iterative solution of the linear equations depend critically on the use of a "preconditioner"—a fast procedure for obtaining a good approximate solution to the linear equations. Because the equations arise from a spatially discretized model, they have some distinctive features which can be exploited to allow specialized preconditioners, which are not available for general sparse matrices, to be used.

For example, the NF (Nested Factorization) algorithm is a preconditioner which is specifically designed to approximate the matrices which arise from space discretization on topologically rectangular meshes.

The method described here has some features in common with NF, but, unlike NF, is ideally suited for execution on massively parallel computer architectures, such as the Graphics Processing Unit (GPU) co-processing systems currently manufactured by companies such as NVIDIA and AMD. Like NF, the method can be used on topologically rectangular meshes, but, in addition, it is suitable for use in more complex cases, including prismatic grids, which are unstructured in 2 dimensions, but with a regular structure in the third.

One practical application for these techniques is in the area of oil reservoir simulation. Oil and gas are produced from porous underground rock formations containing both water and hydrocarbons. Fluids, including oil and gas, are extracted through wells, and wells are also used to inject fluids, such as water, steam, carbon dioxide or chemicals with a view to improving overall production—for example by pushing oil towards a well, or making sticky oil more mobile.

Engineers use oil reservoir simulators to understand what is happening in the reservoir and to explore alternative strategies for optimizing outcomes. The results of a simulation may determine when and where new wells are drilled, and how they are controlled.

Modelling of a reservoir typically proceeds through two phases—history matching (see FIG. 1) and prediction (see FIG. 2). In the history matching phase, the past production of a field and its wells is repeatedly modelled with variations to the geological model designed to improve the match between historical fact and simulation. Once an adequate match is obtained, prediction runs can be started. These runs explore the consequences of alternative operating plans, often extending for several decades into the future. After the chosen plan is put into operation, the model will be re-run from time to time to tune the match, and refine the predictions.

The operation of a typical reservoir simulator is summarized in FIG. 3, and described below:

1. The first step is to gather and/or read data describing the reservoir model defined by the reservoir engineer. Typically this comprises:

Geological data from numerous sources, including seismic analysis, rock cores and well log analysis. The rock porosity and directional permeabilities are key variables, and often vary greatly across the reservoir. The location and characteristics of geological faults must also be specified.

Details of the computational grid; fine grids may give better and more detailed results, but increase computation time.

Fluid properties, such as viscosity, density and phase transition information. Relative permeabilities are used to characterize the mobility of different phases when multiple phases are present. Fluid properties also vary spatially.

Sufficient information to determine the initial state of the main solution variables; these variables will include pressure, and probably the saturations of oil, water and gas. Other variables may represent the hydrocarbon composition and temperature. There may be from two up to 20 or more independent variables in each grid block. The simulator will model the changes to these variables for every grid block through a series of discrete time-steps. This solution is an n-vector, referred to here as x. n is usually the number of grid blocks multiplied by the number of solution variables per grid block.

Additional data specifying detailed control and reporting options.

2. Next the engineer's proposed schedule of operation is read in. This consists principally of the location and characteristics of all production and injection wells, and details of how they will be operated. For example, a well may be opened months or years after the start of the simulation, and its production or injection rates determined partly by conditions in the reservoir or constraints of surface facilities.

3. If the simulation through the schedule of operations has been completed, the simulator produces some final summary data and halts.

4. Select a time-step by which to advance. This may be anything from a few seconds to a year or more, depending on what is required by the schedule, and on numerical considerations.
5. Make an estimate (dx) of the change in the solution variables between the start and end of the time-step. dx, like x, is an n-vector.
6. Begin a second loop to solve the non-linear equations which describe mass conservation in each grid block.
7. Calculate the residuals—which reflect the degree to which material is not conserved for each grid block. For a given grid block, the residuals are found by calculating the amount of all fluids in the cell at the beginning and end of the time step. This difference must be made up by flows from neighbouring grid blocks and wells. Both quantities (fluid in place and flow in or out) depend on the solution variables (pressure, composition, temperature etc.) for the cell and its neighbours (x and x+dx).
8. Determine whether the residuals are sufficiently close to zero to indicate that local and global material balance has been achieved, and the non-linear iteration has converged.
9. If the iteration has converged, update the solution variables x=x+dx and return to step 3.
10. If the iteration has not converged, but the maximum permitted number of iterations has been reached, the current iteration is abandoned, and a solution is instead sought to a simpler problem. A shorter time step is selected, and processing returns to step 5.
11. If the non-linear equations have not converged, the simulator assembles a matrix (A) of derivatives using the current best estimate of the solution (x+dx). Each matrix coefficient represents the rate of variation of a residual (local material balance error) with respect to a solution variable. The resulting matrix equation $$A \cdot ddx = r$$

(where A is an n×n matrix, ddx is an n-vector of changes to the solution variables, and r is an n-vector of residuals) is a linearized version of the non-linear equations. The solution procedure is just an n-dimensional matrix form of Newton's method for finding the zeros of a one-dimensional function.

12. Solve the linear equations formed in step 11. This is often the most time consuming step in the procedure.
13. Update the current estimate of the change to the solution variables during the time step $$dx = dx + ddx$$

and return to step 7.

Oil reservoir simulators are extremely demanding applications which constantly push the boundaries of what computers can do. Engineers have always demanded more sophisticated physics (more variables per grid block) and finer meshes (more grid blocks) both of which trends increase computational requirements. In addition, convergence of the linear and non-linear equations to solution is not a forgone conclusion. In other similarly demanding fields, such as seismic analysis and graphical rendering, the introduction of "massively parallel" GPU style coprocessors has resulted in a step change in compute capability. However oil reservoir simulators do not generally use GPUs because the linear solvers they currently use (step 12 above), often dominate the overall computation time, and cannot easily be adapted to run reliably on massively parallel architectures.

Reservoir simulators often use an iterative linear solver based on GMRES, or a similar Krylov subspace method, with a preconditioner to accelerate convergence. See, for example, Saad, Yousef (2003) Iterative Methods for Sparse Linear Systems, Second Edition, published by SIAM, ISBN 0-89871-534-2, which contains an excellent summary of these methods.

The preconditioner (B) is an approximation to A chosen such that $B^{-1} \cdot x$ can be calculated quickly for an arbitrary vector x. The choice of preconditioner is critical: with a poor choice, the iteration may be very slow, or may not converge at all. In extreme cases the simulator will fail, even with the best known solution methods.

In many cases, two stage solvers, based on CPR (Constrained Pressure Residual—see Wallis, J. R., Kendall, R. P., and Little, T. E. (1985) "Constrained Residual Acceleration of Conjugate Residual Methods", SPE13536, presented at the SPE Symposium on Reservoir Simulation, Houston, Tex., Feb. 10-13, 1985) or a similar method have been found to be effective. The first stage is an outer iteration using the full set of equations, including several variables, such as pressure, temperature, composition etc. for every grid block. These outer iterations are relatively slow and the number required for convergence can be reduced by adding a second stage, in which we iterate towards the solution of a reduced set of equations, often with only one variable, such as pressure, for every grid block. Typically, an adequate solution for the overall system might require a dozen outer iterations, each of which includes a few inner iterations of the reduced system.

FIGS. 4-6 show how a preconditioner fits into the operation of a Krylov subspace iterative solver such as GMRES. The Figures also show how a second stage is added to the basic single stage method.

FIG. 4 illustrates a setup phase for solving linear equations. For example, the steps may be performed according to the following method:
1. The first step is to define the ordering of the matrix variables. The choice of preconditioner may affect the importance of this step.
2. Next, the preconditioner is factored into block upper and lower factors, such that, B=L·U. All the elements of L and U are calculated. In most practical preconditioners, L and U retain most or all of the sparsity of A, and most non-zeros are the same as the corresponding terms in A. In contrast, an exact factorization of A would have many non-zeros. Once this is done, the preconditioner can be applied easily to arbitrary vectors during the iteration phase.
3. An initial estimate of the solution ($x_0$) is generated, or supplied by the calling program. Often $x_0$ is set to 0. The initial residual, $r_0$, corresponding to $x_0$ is calculated.
4. For single stage solvers, we skip steps 5 to 8 and proceed directly to step 9.
5. Using CPR, or similar, compute the scaling factors required to form the reduced equations for the inner iteration.
6. Form the reduced coefficient matrix, C, by combing elements of A using the CPR scaling factors.
7. Define the ordering of the matrix variables for the reduced equations (c.f. Step 1).
8. Factorize the preconditioner, D, for the reduced equations, into upper and lower factors (c.f. step 2).
9. Proceed to the start of the iteration at step 1 in FIG. 5.

FIG. 5 illustrates an outer iteration for solving linear equations. The steps include the following:
1. The iteration counter for the outer iteration, m, is set to 1.
2. If this is a two stage solver then skip to step 4.

3. Use preconditioner to find an approximate solution to the equation $A \cdot q_m = r_{m-1}$ $$q_m = B^{-1} \cdot r_{m-1}$$

and then skip to step 7. If B were exactly equal to A, $q_m$ would take us directly to the solution.

4. If this is a two stage solver, form the residual, $r'_0$, for the reduced equations by combining elements from the full residual, $r_{m-1}$, using the CPR scale factors calculated at step 5 in FIG. 4.
5. Iterate to an approximate solution, x', of the reduced equations using the procedure in FIG. 6.
6. Use the preconditioner for the full equations, together with x', the approximate solution for the reduced equations, to obtain an approximate solution to the full equations.

$$q_m = B^{-1} \cdot (r_{m-1} - A \cdot x') + x'$$

7. Use the matrix multiply routine to form the vector $z_m$ $$z_m = A \cdot q_m$$

8. Find the scalar values $\alpha_1 \ldots \alpha_m$ which minimize the norm of $r_m$ where $$r_m = r_0 + \sum_{i=1}^{m} \alpha_i \cdot z_i$$

9. If the norm of $r_m$ is below the convergence target then skip to step 12.
10. If the iteration limit has been reached, then skip to step 12.
11. Increment the iteration counter, m and return to step 2.
12. Exit with the solution:

$$x_m = x_0 + \sum_{i=1}^{m} \alpha_i \cdot q_i$$

FIG. 6 illustrates an inner iteration for solving linear equations. The inner iteration has logic which is very similar to that in the outer iteration. The steps include the following:

1. The iteration counter for the inner iteration, m, is set to 1. This is distinct from the iteration counter for the outer iteration. The initial residual $r'_0$ is passed from the outer iteration.
2. Use a preconditioner to find an approximate solution to the equation $C \cdot q'_{m-1}$:

$$q'_m = D^{-1} \cdot r'_{m-1}$$

If D were exactly equal to C, $q'_m$ would take us directly to the solution of the reduced equations.

3. Use the matrix multiply routine to form the vector $z_m$:

$$z_m = C \cdot q'_m$$

4. Find the scalar values $\alpha_1 \ldots \alpha_m$ which minimize the norm of $r'_m$ where $$r'_m = r'_0 + \sum_{i=1}^{m} \alpha_i \cdot z_i$$

5. If $r'_m$ is below the convergence target then skip to step 8.
6. If the iteration limit has been reached, then skip to step 8.
7. If the iteration limit has not been reached, increment the iteration counter, m and then return to step 2.
8. Exit with the solution:

$$x' = \sum_{i=1}^{m} \alpha_i \cdot q'_i$$

The reduced equations have a reduced set of solution variables, typically including just the pressure for each gridblock. In mapping this to the full solution space, other variables are typically set to 0.

The above discussion does not specify what preconditioner is used, and we now consider a particular example. The Nested Factorization (NF) Algorithm is a known preconditioning method which may be used to accelerate the convergence of the conjugate gradient, GMRES, OrthoMin and other similar algorithms for iterative solution of large sparse sets of linear equations. The algorithm has been described. See, for example, Appleyard J. R., Cheshire I. M., and Pollard R. K. (1981) "Special techniques for fully-implicit simulators." In Proc. European Symposium on Enhanced Oil Recovery Bournemouth, UK, pages 395-408. See also Appleyard J. R. and Cheshire I. M. "Nested factorization." In Seventh SPE Symposium on Reservoir Simulation, pages 315-324, 1983. paper number 12264. Further, see P. I. Crumpton, P. A. Fjerstad and J. Berge: 'Parallel Computing Using a Commercial Reservoir Simulator', paper presented at ECMOR VIII, 3-6 Sep., 2002. The original NF algorithm described in these references assumes that the matrix is formed by considering connections between neighbouring blocks in a simple topologically rectangular grid.

For an $n_x$ by $n_y$ by $n_z$ grid, the banded coefficient matrix A is $$A = d + u + l + v + m + w + n$$

where:
d is the diagonal,
u and l are the bands immediately above and below the diagonal, which connect adjacent cells within a line,
v and m are the bands $n_x$ elements away from the diagonal, which connect adjacent lines within a plane,
w and n are the bands $n_x * n_y$ elements away from the diagonal, which connect adjacent planes.

FIG. 7 shows an example of a 4×4×2 rectangular grid with NF ordering. The matrix for the grid has the structure shown in FIG. 8, based on an ordering of cells as shown in FIG. 7. This matrix can be regarded as recursively block tridiagonal. At the outermost level each block element represents a plane, or the coefficients connecting adjacent planes. Within each plane, the blocks represent lines, and coefficients connecting adjacent lines. At the innermost level, there are individual grid blocks and the connections between individual grid blocks within lines.

NF exploits this recursive structure by defining the preconditioner, B, recursively:

$$B = (I + n \cdot P^{-1}) \cdot (P + w)$$

(B is block tridiagonal—block elements are planes)
where I is the unit matrix
and $P = (I + m \cdot T^{-1}) \cdot (T + v)$ (P is block tridiagonal—block elements are lines)
and $T = d + l + u - \text{approx}(\epsilon)$ (T is tridiagonal)
and $\epsilon = m \cdot T^{-1} \cdot v + n \cdot P^{-1} \cdot w$ (the uncorrected error matrix)

approx(ε) is a matrix which is computed to approximate ε. It is usually diagonal, but could be tridiagonal, or even more complex. Common approximations are:

diag(ε) the diagonal elements of ε rowsum(ε) the diagonal matrix formed by summing the elements of ε in rows colsum(ε) The diagonal matrix formed by summing the elements of ε in columns.

zero(ε) a zero matrix.

Any of these approximations could be modified by a relaxation factor as described in Kumar, P., Grigori, L., and Niu, Q. (2009) "Combinative preconditioning based on Relaxed Nested Factorization and Tangential Filtering preconditioner" INRIA Rapport de recherche, ISSN 0249-6399.

After expansion, the following is obtained:

$$B = A + \epsilon - \mathrm{approx}(\epsilon)$$

In summary, B is a partial L·U factorization, but unlike most other similar methods, the factors L and U are block (rather than strictly) lower and upper triangular. For the example 4×4×2 finite difference matrix, $(I+n \cdot P^{-1})$ and $(P+w)$ are 2×2 matrices:

| I | |
|---|---|
| $n \cdot P_a^{-1}$ | I |

| $P_a$ | w |
|---|---|
| | $P_b$ | where $P_a$ and $P_b$ are themselves matrices which connect cells within the 2 planes, and n, w are diagonal matrices containing elements from A. To compute $B^{-1} \cdot x$, where x is a vector, first sweep forward through the planes to obtain $(I+n \cdot P^{-1})^{-1} \cdot x$, and then back to apply $(P+w)^{-1}$. The problem is thus reduced to solving $P^{-1} \cdot x$ for each plane, and from three dimensions to two.

For a suitable choice of P ($P = A - n - w - n \cdot P^{-1} \cdot w$), this factorization of A is exact. However an exact factorization is not practical for large matrices, and instead, each block element of P is approximated in the same way—with an incomplete block L·U factorization.

$$P_a = (I + m \cdot T^{-1}) \cdot (T+v)$$

For the example matrix, $(I+m \cdot T^{-1})$ and $(T+v)$ are 4×4 matrices:

| I | | | |
|---|---|---|---|
| $m_a T_a^{-1}$ | I | | |
| | $m_b T_b^{-1}$ | I | |
| | | $m_c T_c^{-1}$ | I |

| $T_a$ | $v_a$ | | |
|---|---|---|---|
| | $T_b$ | $v_b$ | |
| | | $T_c$ | $v_c$ |
| | | | $T_d$ | where $T_a$, $T_b$, $T_c$ and $T_d$ are themselves 4×4 matrices which connect cells within a line, and m, v are diagonal matrices containing elements from A. The evaluation of $P_a^{-1} \cdot x$ proceeds in the same way as that of $B^{-1} \cdot x$, and the problem is further reduced from 2 dimensions to 1. The solution of the one-dimensional problems, which are of the form $T_a^{-1} \cdot x$ (where $T_a$ is tridiagonal) is then a simple matter which terminates the recursion. There are three levels of recursion because the computational grid occupies a three-dimensional space.

In fact, the NF preconditioner can be shown to be equivalent to a strictly triangular factorization, but with L and U factors that include a good subset of the fill-in bands produced by a Cholesky factorization. However the computational work and storage required by NF is much less than would be required to calculate the fill-ins. This explains why NF performs better than ILU methods.

The NF algorithm was designed around rectangular grid geometries, and the innermost loops involve the solution of tridiagonal matrices representing lines of grid blocks. In practice, NF has been extended from this simple case in a number of ways, for example:

Extension to coupled "multi-phase" problems with several independent variables (e.g. pressure, temperature and composition) in each grid block. In this case individual matrix elements are small (e.g. 4×4) dense matrices rather than scalars, but the algorithm is otherwise unchanged.

Accommodation of "non-neighbour" connections that can be used to introduce some more complex geometries, such as local grid refinements.

Accommodation of "nine-point" finite difference terms (non-zero terms connecting diagonally adjacent grid blocks).

Extra levels of recursion to deal with some classes of problem which can be thought of as four or five dimensional (multiple porosity models).

Inclusion of higher order error correction terms on the l and u terms in the tridiagonal.

A method has been described for applying NF to 2D unstructured meshes and 3D prismatic meshes. See Kuznetsova, N. N. et al, (2007) "The Family of Nested Factorizations", Russ J. *Numer. Anal. Math. Modelling*, Vol. 22, No. 4 pp 393-412. The method retains the assumption of tridiagonal inner blocks.

US Patent Application Publication 2009/0138245 filed by John Appleyard, which is incorporated herein in its entirety, extends the method by allowing for unstructured grids, and for additional options when dealing with structured grids.

In addition, there have been several implementations of versions of NF which are adapted to run on parallel machines. These include:

Versions designed to work on "cluster" computers using domain decomposition (see e.g. P. I. Crumpton, P. A.

Fjerstad and J. Berge: 'Parallel Computing Using a Commercial Reservoir Simulator', paper presented at ECMOR VIII, 3-6 Sep., 2002), with periodic exchange of data between the boundary regions of adjacent domains. Multi-color orderings may be used to allow communication and computation to be overlaid. These methods can work very well for small clusters—up to a few dozen processors—but may not scale well beyond that.

Twisted factorization may be used to allow the work in each level of recursion to be split into 2 parts which can be executed in parallel. For a 3D problem, with 3 levels of recursion, this means that the work can be shared between 8 processors. This method is described in H. van der Vorst's "Large tridiagonal and block tridiagonal linear systems on vector and parallel computers" published in Parallel Computing Vol. 5, 1987, pp 45-54 (hereafter "van der Vorst").

Neither of these techniques is appropriate for implementation on massively parallel architectures, such as those of modern GPUs, which require hundreds, or, preferably, thousands of threads to be active simultaneously.

BRIEF DESCRIPTION OF THE DRAWINGS

FIG. 1 is a flow diagram that illustrates a procedure for history matching for use in modelling of a reservoir or other problem.

FIG. 2 is a flow diagram that illustrates a procedure for developing a production plan.

FIG. 3 is a flow diagram that illustrates a procedure that may be used for reservoir simulation.

FIG. 4 is a flow diagram that illustrates the setup phase of a procedure for solving linear equations.

FIG. 5 is a flow diagram that illustrates the outer iteration phase of a procedure for solving linear equations.

FIG. 6 is a flow diagram that illustrates the inner iteration phase of a procedure for solving linear equations.

FIG. 7 illustrates a 4×4×2 rectangular grid used for nested factorization ordering.

FIG. 8 illustrates an exemplary matrix structure for a 4×4×2 rectangular grid.

FIG. 9 illustrates a 6×6×4 rectangular grid and the corresponding matrix structure with natural ordering.

FIG. 10 illustrates a 6×6×4 rectangular grid and the corresponding matrix structure with lines ordered using a chequerboard color scheme.

FIG. 11 illustrates a 6×6×4 rectangular grid and the corresponding matrix structure with lines ordered using a 3 color oscillatory method for assigning colors.

FIG. 12 illustrates a 6×6×4 rectangular grid and the corresponding matrix structure with lines ordered using a 4 color oscillatory method for assigning colors.

FIG. 13 illustrates a 6×6×4 rectangular grid and the corresponding matrix structure with lines ordered using an alternative 4 color oscillatory method for assigning colors.

FIG. 14 illustrates a 6×6×4 rectangular grid and the corresponding matrix structure with lines ordered using a 4 color cyclical method for assigning colors.

FIG. 15 illustrates an aerial view of an unstructured 2D grid of a prismatic grid.

FIG. 16 illustrates the matrix structure generated by applying a Massively Parallel Nested Factorisation (MPNF) procedure to the prismatic grid shown in FIG. 15.

FIG. 17 illustrates a 6×6×4 rectangular grid and the corresponding matrix structure with lines ordered using 2 line kernels and a 4 color oscillatory method for assigning colors.

FIG. 18 is a flow diagram that illustrates the MPNF ordering procedure.

FIG. 19 is a flow diagram that illustrates the MPNF kernel color assignment procedure.

FIG. 20 is a flow diagram that illustrates the MPNF factorization procedure.

FIG. 21 is a flow diagram that illustrates the MPNF preconditioning procedure for arriving at a solution.

DETAILED DESCRIPTION

Several exemplary techniques for generating and utilizing preconditioners are described herein. According to one implementation, a hardware implemented method is disclosed to create an ordering of grid blocks for a parallel processing preconditioner. The method includes defining a mesh of grid blocks that represents a problem domain to be solved by an iterative method which uses the parallel processing preconditioner; determining a dominant direction for the mesh of grid blocks; defining a plurality of kernels, each kernel comprising matrix elements connecting within one or more adjacent lines of the grid blocks oriented along the dominant direction; determining how many lines are included in each kernel and how the lines are arranged within each kernel; determining how many colors will be used to divide the full set of kernels into colored subsets of kernels; assigning a color designation to each kernel, in such a way that kernels have no interactions, or weak interactions with other kernels having the same color; defining an order of processing from a first color to a last color; defining an order of processing of each kernel within that color; defining an order of grid blocks within each kernel along the dominant direction from one end of the kernel to the other end of the kernel; and adding each corresponding grid block to the matrix in the defined order.

According to another implementation, a hardware implemented factorization procedure is disclosed for pre-calculating terms of a preconditioning matrix. The procedure includes selecting a method for factorizing and solving the inner kernels of the preconditioning matrix; selecting a first color subset of the kernels; factorizing each of the kernels that comprise the selected colored subset using the method selected; calculating a correction for kernels which have not yet been factorized using the newly factorized kernels; selecting the next colored subset of the kernels; and repeating the factorizing, calculating, and selecting steps until all colored subsets of kernels have been factorized. In an implementation, the correction calculated for kernels which have not yet been factorized includes at least one of the following: a diagonal matrix formed by summing elements of the error matrix in columns, a diagonal matrix formed by summing elements of the error matrix in rows, a diagonal matrix formed by dropping off-diagonal elements of the error matrix, a null correction, or any of these matrices scaled using a relaxation factor. The factorizing of the kernels that comprise the selected colored subset, and the calculating of a correction for kernels which have not yet been factorized, may be performed using one or more processors operating in parallel, the processors being either within a single computer system, or within multiple connected computer systems.

According to an implementation, a hardware implemented procedure is disclosed for utilizing a Massively Parallel Nested Factorisation (MPNF) preconditioning matrix having a plurality of kernels to converge to a solution. The procedure includes forward and backward sweeps through a predefined set of colors that are used to characterize the matrix. The forward sweep includes selecting a first colored subset of the kernels of the preconditioning matrix, solving the equations corresponding to each of the kernels that comprise the selected colored subset, to obtain the corresponding part of an intermediate solution, computing a correction to the equations for all unprocessed colored subsets using the newly computed intermediate solution, and repeating the selecting, solving, and computing steps for each unprocessed colored subset until no more unprocessed color subsets remain. The backward sweep includes selecting the last colored subset processed in the forward sweep and setting the actual solution for that subset to the intermediate solution; computing a correction to the equations for all colored subsets not yet selected in the reverse sweep, using those parts of the actual solution which have already been computed in the backward sweep; selecting the next colored subset not previously selected in the backward sweep, the colored subsets being selected in a reverse order from the order of the forward sweep; solving the equations corresponding to each of the kernels that comprise the selected colored subset, to obtain the corresponding part of the actual solution; and repeating the selecting, computing, selecting, and solving of the backward sweep until no more colored subsets processed by the forward seep remain to be processed by the backward sweep. Some of the corrections on the forward and backward sweeps may be omitted on some iterations, to avoid delays which would result from passing the corrections between processors or connected computer systems.

According to another implementation, a hardware implemented procedure is disclosed for ordering a preconditioner matrix. The procedure includes defining a mesh of grid blocks that represents a problem domain to be solved using the preconditioner matrix; determining a dominant direction for the mesh of grid blocks; defining a plurality of kernels, each kernel comprising matrix elements connecting within one or more adjacent lines of the grid blocks oriented along the dominant direction; determining how many lines are included in each kernel and how the lines are arranged within each kernel; selecting a two dimensional mesh grid comprising the kernels, but, for this purpose, ignoring connections along the dominant direction; setting up a color sequence that specifies the order in which colors are to be assigned to kernels in the two dimensional mesh grid; setting one or more non-adjacent kernels to a first color of the color sequence; creating a kernel candidate list, comprising the kernels that have not been assigned any color, but that are adjacent to at least one kernel that has been assigned a color; sorting the candidate list based on the number of different colors in adjacent kernels for each kernel and in order of decreasing numbers of different colors in adjacent kernels; selecting the next color from the color sequence; assigning the selected color to the kernels in the sorted candidate list starting with the kernel with the highest number of different colors in adjacent kernels, provided that the kernel to be assigned a color is not adjacent to any kernel with the current color, including kernels assigned a color in the current step; repeating the creating, sorting, selecting, and assigning steps until all the kernels are colored; and generating a preconditioner matrix in which equations and variables are ordered by reference to the color assigned to each kernel and the component grid blocks of each kernel.

In an exemplary embodiment, referred to herein for convenience as a "Massively Parallel Nested Factorisation" technique or MPNF, a version of NF is produced that runs efficiently on massively parallel computer architectures, such as the GPU based coprocessors manufactured by NVIDIA and AMD. This will be done by replacing the 2 outer layers of NF, in which we deal with connections within and between planes, with a layer that deals with "colors" and connections between colors, and another layer in which many lines are processed in parallel. In standard NF, each line belongs to a plane in a geometrically obvious way, but in MPNF, each line is instead assigned a color, in such a way that adjacent lines have different colors. For rectangular structured grids this can be done with only 2 colors, using a 2D "chequerboard" ordering scheme to color each line. In practice, it is usually preferable to use schemes with several colors, and to select a scheme in which the color adjacency graph is, so far as possible, tridiagonal. This ensures that, as in standard NF, the coefficient matrix has a nested tridiagonal structure.

The parallelism of MPNF arises because there are no connections between lines of the same color, and they can be processed simultaneously. In short, the matrix for lines within a color is block diagonal, rather than block tridiagonal. For example, given a rectangular 100×100×100 grid, a 4 color ordering will result in roughly 2,500 lines of each color. When the preconditioner runs, those 2,500 lines can be assigned to separate threads, and processed simultaneously.

Even greater parallelism can be achieved by changing the procedure used for solving on lines at the innermost layer of recursion. The simplest alternative to the standard Thomas algorithm is Twisted Factorization (for example, see van der Vorst), which does not increase the overall work required, but allows most of the work to be split between 2 processors working in parallel. Recursive doubling and cyclic reduction (also described in van der Vorst) allow even more processors to be used, but the amount of work is significantly increased, so that there may be no net benefit on some architectures.

FIGS. 9 to 14 illustrate how MPNF techniques may be applied to ordered rectangular grids to obtain preconditioner matrices and may allow parallel processing of multiple kernels simultaneously.

FIG. 9 shows a matrix produced by a standard ordering of a 6×6×4 grid. The grid, shown at the top of FIG. 9, illustrates a layout or mesh of grid blocks, each grid block having a number. The mesh of grid blocks represents a problem domain to be solved by an iterative method. The grid blocks are ordered in lines along a dominant direction of the mesh of grid blocks. The lines of grid blocks are highlighted by the solid lines or borders on the grid. For example, one line of grid blocks includes grid blocks 1-4, another line of grid blocks includes grid blocks 5-8, and so forth. The numbering is also used to define planes, with, in this case, each plane comprising 6 lines. The first plane includes grid blocks 1-24, and the second, grid blocks 25-48 etc.

The matrix, shown in the bottom portion of FIG. 9, contains one equation (or row) for each grid block, numbered from top to bottom in the order described above. Each equation contains terms (or columns) for every grid block, numbered from left to right in the same order. The main diagonal of the matrix (from top left to bottom right) comprises "self-terms" specifying the contribution to the equation of a grid block from the state variables in the same grid block. However, the equation for a grid block also contains terms for neighbouring grid blocks. Where two grid blocks are adjacent, there are 2 terms away from the main diagonal, corresponding to the row of one grid block and the column of the other. For grid blocks which are not adjacent, the corresponding matrix element terms are zero. Each block of the matrix represents connections between grid blocks within a line, or between lines and within a plane, or between planes.

The matrix shown in the bottom portion of FIG. 9 may be regarded as block tridiagonal. At the outermost level each block element represents a plane, or the coefficients connecting adjacent planes. Within each plane, the blocks represent lines, and coefficients connecting adjacent lines. At the innermost level, there are individual grid blocks and the connections between individual grid blocks within lines.

FIG. 10 shows an MPNF generated matrix produced by a simple checkerboard ordering of a 6×6×4 grid, similar to that shown in FIG. 9. In the upper portion of FIG. 10, an aerial view is shown of a grid; the 6×6 portion of the grid is shown in the figure, while the 4 layers of the grid in the other dimension extend into the page. The lines of grid blocks are each assigned a color in an alternating fashion, and instead of the natural ordering shown in FIG. 9, all of the lines with color 1 are inserted into the rows and columns of the matrix before all of the lines with color 2. Thus, the top left quarter of the matrix contains links between grid blocks with color 1, and the bottom right quarter contains links between grid blocks with color 2. The other two quarters of the matrix contains links between grid blocks with different colors. FIGS. 9 and 10 represent the same physical problem, and the difference between them results only from the different methods used to number the grid blocks. However the different ordering of FIG. 10 is much more suitable for parallel processing, because it reveals that lines with a given color are not linked, and can be processed simultaneously.

As described with regard to FIG. 9, a dominant direction for the mesh of grid blocks is determined A plurality of kernels is also defined, each kernel comprising matrix elements connecting within one or more adjacent lines of the grid blocks oriented along the dominant direction. The number of lines included in each kernel is determined as is how the lines are arranged within each kernel. In this example, two colors are used to divide the full set of kernels into colored subsets of kernels. The kernels within a colored subset have no interactions with each other. An order of processing from the first color to second color is defined. Thus, the left upper large square within the matrix may represent the first color and the lower right large square within the matrix may represent the second color. An order of processing of each kernel within that color is defined. The kernels appear as the second largest squares in the matrix. For example, there are 18 kernels in the block representing each color. An order of grid blocks within each kernel is defined along the dominant direction from one end of the kernel to the other end of the kernel. Each corresponding grid block, represented using a black square in the matrix, is added to the matrix in the defined order. As there are no common faces between adjacent kernels of the same color, the kernels may be processed simultaneously.

FIGS. 11 and 12 show similar examples of MPNF applied to a rectangular grid. For example, FIG. 11 shows a 3 color ordering of the same grid shown in FIG. 9. FIG. 12 shows a 4 color ordering of the same grid. FIGS. 11 and 12 additionally illustrate a color adjacency graph showing which colors are adjacent to each other based on the ordering method used, which in the case of FIGS. 11 and 12 is an oscillatory ordering method.

There are different ways to assign colors in a multi-color ordering technique—see, for example, the alternative 4 color schemes highlighted by the dotted lines in FIGS. 13 and 14—and any will produce a working preconditioner. However, the best numerical results are generally obtained when the color adjacency graph is tridiagonal. This in turn results in a block tridiagonal matrix structure. The most obvious and commonly used approach to multi-color ordering is cyclical numbering (1234123412.) as shown in FIG. 14, but this does not lead to a block tridiagonal structure, and, in practice, oscillatory orderings (12343212.) as shown in FIGS. 11, 12 and 13, which do produce a block tridiagonal matrix structure, have much better convergence properties.

For prismatic grids, which are unstructured in two dimensions, but with a regular structure in the third, the same approach can be used, though more colors are required. It is not usually possible to achieve a completely block tridiagonal matrix structure in this more general case, but with care, there will be relatively few terms outside that structure. FIG. 15 shows an aerial view of simple triangular prismatic grid, together with color assignments for each vertical line of grid blocks, assuming a six color ordering scheme. The corresponding matrix structure is shown in FIG. 16, and it can be seen that, although some terms do not fit into the block tridiagonal structure, most do.

The construction of the MPNF preconditioning matrix, B is exactly as with NF, except that P is now block diagonal rather than block tridiagonal.

$$B=(I+m\cdot P^{-1})\cdot(P+v)$$

(B is block tridiagonal—block elements are colors)
where I is the unit matrix
and P=T (P is block diagonal—block elements are lines)
and T=d+l+u-approx($\epsilon$) (T is a tridiagonal matrix)
and $\epsilon = M \cdot P^{-1} \cdot v$ (the uncorrected error matrix)

Here, l and u represent connections within lines, and m and v connections between lines of different colors.

This MPNF procedure produces a less accurate preconditioner than standard NF. As a result, it will generally take more iterations with MPNF to converge to a solution. However, on suitable hardware, each iteration will be executed very much more quickly, and this may more than compensate for the increased iteration count.

It is also possible to create more accurate preconditioners at the cost of reduced parallelism. This can be done by increasing the number of colors. For example, increasing the number of colors from 3 to 4 will generally produce a more accurate preconditioner, but the fraction of line kernels that can be executed simultaneously is reduced from one third of the total to a quarter.

Another approach is to increase the number of lines in the innermost kernels—using the procedures described in US Patent Application Publication 2009/0138245. For example, FIG. 17 shows an example where the inner kernels contain 2 adjacent lines of cells, instead of just 1. In that case T is pentadiagonal, rather than tridiagonal, but the procedure described above is otherwise unchanged. This often produces a much better preconditioner, but the total work per iteration is increased, and the number of parallel kernels is halved.

FIG. 18 shows the computer hardware implemented procedure used to create an MPNF ordering, and describes how it differs from standard NF ordering:

1. The first step is to determine which is the dominant direction. The MPNF algorithm effectively eliminates errors within lines, and a correct choice may make a significant difference for non-isotropic problems. A simple procedure which can often be used for finding the dominant direction is to sum the absolute values of coefficients joining cells within a line for each of the 3 possible choices, and to select the direction with the largest sum. In some cases, there is a strong dominant direction; for example in many geological models the vertical direction is dominant, because the formation thickness is much less than its horizontal extent. This step is identical in the standard NF algorithm.
2. Next, the number and arrangement of lines to be included in each kernel is determined. Increasing the number of lines in a kernel improves the accuracy of the preconditioner, but reduces the amount of parallelism. Larger kernels may be selected for hard problems which might not otherwise be solved, or for very large problems, which have more than enough kernels to keep all the processors busy. Depending on the magnitude of the coefficients in the 2 non-dominant directions, the lines may be arranged in one of several different ways. For example, 4 lines could be arranged in 2×2 or 4×1 arrangements. The objective in choosing the arrangement is to ensure that the largest coefficients fall within the kernels, and that the unresolved links between kernels are minimized. The original NF algorithm dealt only with single lines, but this type of extension to larger kernels was discussed in US Patent Application Publication 2009/0138245.

3. Next, the number of colors to be used is determined Increasing the number of colors improves the accuracy of the preconditioner, but reduces the amount of parallelism. More colors may be selected for hard problems which might not otherwise be solved, or for very large problems, which have more than enough kernels to keep all the processors busy. More colors are required for unstructured prismatic grids than for structured grids. The original NF algorithm does not use colors.

4. The next step is to assign a color to each kernel. When viewed along the dominant direction, the kernels form a 2-dimensional grid, and a procedure like that shown in FIG. 19 can be used to assign colors to each kernel. For structured grids, the use of an oscillatory ordering scheme will result in a block tridiagonal matrix. For prismatic grids which are unstructured in two dimensions, but with regular structure in the third, some terms fall outside the block tridiagonal structure, even with oscillatory ordering. However oscillatory ordering usually works better than cyclical ordering, even in this case.

5. The order of grid blocks is then defined differently from other NF algorithms, as follows:
   For each color, working in order from first to last.
   For each kernel within that color. The order or kernels may not be important.
   For each layer, working along the dominant direction from one end to the other
   For each line within the current kernel
   Add the corresponding grid block to the matrix.

FIG. 19 shows a computer hardware implemented procedure which may be used to color the kernels on a 2 dimensional grid which may be structured or unstructured.

1. Set up a color sequence, which specifies the order in which colors are to be assigned. For example, the sequence could be cyclical (e.g. 1234123412 . . . ) or oscillatory (e.g. 12343212343 . . . ). For structured grids, there must be at least 2 colors, but for unstructured grids more colors are required.
2. Set c to the first color in the color sequence.
3. Pick one or more non-adjacent starting kernels, and set their color to c.
4. Set c to the next color from the color sequence.
5. Create a list of "candidate" kernels. These are the kernels that have not been assigned a color, but are adjacent to at least one kernel that has been colored.
6. If there are no candidates, then exit the procedure. If some kernels are still uncolored, then the remaining kernels are in separate islands, and the entire procedure should be repeated for each island.
7. For each candidate, compute s, the number of different colors in adjacent kernels.
8. Sort the candidate list by decreasing values of s. Candidates with the same value of s may be in any order.
9. Pick the first candidate (with highest value of s).
10. If the candidate is not adjacent to any kernel with color c, or if the candidate has adjacent kernels of every available color, then set its color to c. The latter condition results in adjacent kernels with the same color, but is required to stop the procedure from looping indefinitely. A better solution is to restart the procedure with a sequence containing more colors.
11. If there are no more candidates in the candidate list, go to step 4.
12. If there are more candidates, pick the next, and go to step 10.

FIG. 20 shows the MPNF factorization computer hardware implemented procedure, which is used to pre-calculate the terms in the block LU factorization of the preconditioning matrix so that it can be applied repeatedly during the iteration.

1. Select the preferred method for factorizing and solving the inner kernels. Various methods can be used:
   Thomas's algorithm. This operates on a single processor.
   Twisted Factorization. This method requires no more work than Thomas's algorithm, and allows 2 processors to work simultaneously on a single kernel.
   Recursive Doubling or Cyclic Reduction. These methods require much more work, but allow many processors to work simultaneously.
   Block versions of all of these methods may be used for multi-line kernels. The choice between these methods may depend on details of the hardware in use, and on the dimensions of the problem being solved. All should produce the same results, subject to floating point rounding errors.
2. Select the first color.
3. Factorize each of the kernels that comprise this color using the method selected at step
   1. This step can be performed in parallel, with each kernel assigned to a different processor (or for some factorization methods to more than one processor).
4. If there are no more colors, then exit.
5. Calculate a correction for the next color using the previously factorized colors. The correction usually takes the form of a diagonal matrix which is added to the diagonal for the next color. This step can be performed in parallel, with different processors calculating different parts of the correction. The correction is of the form approx $(m \cdot T^{-1} \cdot v)$ where m and v are the block lower and upper matrix terms connecting current color to the next. T comprises the set of kernels in the current color—which we have just factorized. The approx function is commonly replaced by diag, rowsum, colsum, or zero as defined below:
   $diag(\epsilon)$ the diagonal elements of $\epsilon$.
   $rowsum(\epsilon)$ the diagonal matrix formed by summing the elements of $\epsilon$ in rows.
   $colsum(\epsilon)$ the diagonal matrix formed by summing the elements of $\epsilon$ in columns.
   $zero(\epsilon)$ a zero matrix.
   Relaxation factors may be applied to any of these corrections.
6. Select the next color and return to step 3.

The MPNF solution procedure computes $$q = B^{-1} \cdot r$$

where B is the MPNF approximation to the coefficient matrix A, and q and r are vectors.

$$B = (I + m \cdot P^{-1}) \cdot (P + v)$$

(B is block tridiagonal—block elements are colors)
where I is the unit matrix
and P=T (P is block diagonal—block elements are lines)
and T=d+l+u−approx($\epsilon$) (T is a tridiagonal matrix)
and $\epsilon$=m·P$^{-1}$·v (the uncorrected error matrix)

Here, l and u represent connections within kernels, and m and v connections between kernels of different colors. In the standard NF preconditioner, the m and v terms would have been split between the 2 outer layers of preconditioner, connecting lines within a plane, or connecting planes. In MPNF, none of these terms appear in the middle layer, connecting kernels within a color, and it is this that makes MPNF suitable for parallel execution. Instead, both sets of terms appear in the outer layer, connecting colors, but by using a suitable oscillatory ordering scheme for colors, the matrix retains, to a good approximation, the preferred block tridiagonal structure.

In cases where we use multi-line kernels, many of the terms which otherwise are in the m and v matrices fall instead within l and u. For example, FIG. 17, which shows that the matrix structure for 2 line kernels, has fewer m and v elements than FIG. 12, with single line kernels. As a result, there are many fewer terms in the error matrix, $\epsilon$, and the MPNF preconditioner is more accurate.

The solution procedure consists of two stages, a forward sweep to calculate $$s=(I+m\cdot P^{-1})^{-1}\cdot r$$

and a backward sweep to compute $$q=(P+v)^{-1}\cdot s$$

where s is an intermediate vector.

FIG. 21 is a flowchart of a computer implemented procedure for generating a solution to a problem using the MPNF preconditioner. Steps 1 to 5 represent the forward sweep to calculate s, and steps 6 to 9 the backward sweep to compute q. The method may be performed as follows:

1. Select the first color.
2. If this is the last color then skip to step 6.
3. Solve each of the kernels that comprise this color using the method selected at step 1 of the factorization procedure. This step can be performed in parallel, with each kernel assigned to a different processor (or for some methods to more than one processor).
4. Compute a correction for the solution in the next color. The correction uses the just-solved data from the current color, and is of the form:

$$m\cdot s$$

where m is the lower block matrix connecting the current and next colors and s is the solution obtained at step 3. On distributed processing systems, this step may be omitted on some iterations for those corrections which require inter-domain transfers.
5. Select the next color and return to step 2.
6. Solve each of the kernels that comprise this color. (see step 3)
7. If this is the first color then finish.
8. Compute a correction for the solution in the previous color. The correction uses the just-solved data from the current color, and is of the form:

$$v\cdot q$$

where v is the upper block matrix connecting the current and previous colors and q is the solution obtained at step 6. On distributed processing systems, this step may be omitted on some iterations for those corrections which require inter-domain transfers.
9. Select the previous color and return to step 6.

It was noted above that Reservoir Simulators often use a 2 stage preconditioner with an inner iteration using a reduced set of equations generated by a CPR (see Wallis, J. R., Kendall, R. P., and Little, T. E. (1985) "Constrained Residual Acceleration of Conjugate Residual Methods", SPE13536, presented at the SPE Symposium on Reservoir Simulation, Houston, Tex., Feb. 10-13, 1985) or a similar procedure. One commonly used decoupling procedure is Quasi-IMPES (see Scheichl, R., Masson, R. and Wendebourg, J.: "Decoupling and Block Preconditioning for Sedimentary Basin Simulations," Computational Geosciences, Vol. 7, 2003, pp. 295-318). When using Quasi-IMPES, we have found that, for best performance, the preconditioner for the inner iteration may be based on the rowsum approximation. This is because the reduced matrix (C) is formed as $$C = \sum_{i=1}^{m} D_i \cdot A_{i1}$$

where $D_i$ is a diagonal matrix, and $A_{i1}$ comprises the sub-matrix of A for component i that multiplies the pressure components of the solution vector. In practice, $A_{i1}$ is near-symmetric, and the asymmetries in C are largely due to the differences between elements of $D_i$. It's easy to show that the rowsum approximation works best in such cases. We have found that when using MPNF, a relaxation factor of around 0.85 gives good convergence. The procedure is not sensitive to the precise value of this number, and anything between around 0.5 and 0.97 would work well.

For the outer iteration of a 2 stage preconditioner, the best convergence is obtained using the "diag" approximation. However in practice, there is little difference between this and the "zero" approximation and the latter is often quicker because less computation is required in the factorization step.

For single stage MPNF preconditioners, best results are obtained using a colsum constraint together with a modest relaxation factor. The colsum constraint is appropriate in this case because the matrix is constructed using material balance equations which ensure that flow terms sum to zero in columns.

It should be noted that many of the extensions to the original NF algorithm are equally applicable to MPNF. For example:

Extension to coupled "multi-phase" problems with several independent variables (e.g. pressure, temperature and composition) in each grid block. In this case individual matrix elements are small (e.g. 4×4) dense matrices rather than scalars, but the algorithm is otherwise unchanged.

Accommodation of "non-neighbour" connections that can be used to simulate some more complex geometries, such as local grid refinements.

Accommodation of "nine-point" finite difference terms (non-zero terms connecting diagonally adjacent grid blocks).

Extra levels of recursion to deal with some classes of problem which can be thought of as 4 or 5 dimensional (multiple porosity models).

Inclusion of higher order error correction terms in the band matrix.

Extension to more general non-tridiagonal inner blocks resulting from multi-line kernels, and unstructured meshes.

An important advantage of the MPNF algorithm is that it can be used unchanged in conjunction with the large scale domain decomposition approach to parallelism in common use today. See P. I. Crumpton, P. A. Fjerstad and J. Berge: 'Parallel Computing Using a Commercial Reservoir Simulator', paper presented at ECMOR VIII, 3-6 Sep., 2002. This would call for the problem to be divided into domains, each of which is processed by a single computer or CPU core with a GPU style processor attached, and with data exchanges between domains facilitated by a fast network or system bus. In applying the MPNF Factorization and Solution procedures shown in FIGS. 20 and 21, a given color is processed simultaneously on all domains. Data exchange of boundary terms between domains is required when applying corrections at step 5 in FIG. 20, and steps 4 and 8 of FIG. 21. These exchanges can take place concurrently with each other, and with the corrections within domains. However, depending on hardware details, such inter-domain transfers can involve significant delays, which reduce the overall speed of the solution procedure. In cases where this is a problem, the algorithm can be modified so that some of the exchanges are simply not done, with the corresponding corrections taking an arbitrary value, such as zero. This allows the hardware to run closer to its potential, but reduces the accuracy of the algorithm, and increases the required number of iterations.

The following summarizes at least some advantages of MPNF based techniques and procedures described herein:

With suitable reordering of the equations, it is possible to implement a variant of NF that can be executed on massively parallel computer architectures.

For multi-color ordering on structured grids, an oscillatory ordering scheme leads to a block-tridiagonal matrix structure. This produces better numerical results than a conventional cyclical ordering.

Accuracy may be increased by increasing the number of lines in each kernel, although this reduces the number of kernels that can be executed in parallel.

Accuracy may be increased by increasing the number of colors, although this reduces the number of kernels that can be executed in parallel.

For unstructured prismatic grids, for example with an unstructured triangular grid in two dimensions, and regular divisions in the third, it is possible to use the same oscillatory ordering scheme used for structured grids, and although some terms inevitably fall outside the target block tridiagonal structure, results are better than with other coloring schemes.

The equations within a single or multi-line kernel may be solved by simple or block versions of various algorithms, including Thomas's algorithm, Twisted Factorization, Recursive Doubling and Cyclic Reduction. The optimum choice depends in general on details of hardware and problem dimensions.

1 and 2 stage preconditioners with high parallel efficiency can be constructed using MPNF.

A "relaxed rowsum" correction is most effective for the inner iteration of a 2 stage MPNF preconditioner.

A "diag" or "zero" correction is most effective for the outer iteration of a 2 stage MPNF preconditioner.

A "relaxed colsum" correction is most effective for a single stage preconditioner.

MPNF works unchanged, or with minor changes as described above, on cluster style computers with multiple CPU and GPU style processors. This allows the algorithm to be used with high parallel efficiency on very large distributed problems.

Although exemplary embodiments have been described above particularly in relation to oil reservoir simulation, it will be appreciated that similar embodiments will find practical application in many other related areas, for example including but not restricted to the following:

Computational Fluid Dynamics (CFD). CFD programs are used for problems involving moving fluids (liquids and gases)—particularly fluids moving around solid objects, such as vehicles, pumps, buildings, chemical apparatus or ventilation systems. The common feature of CFD programs is that they deal with the solution of the Navier-Stokes equations. However they may also deal with other issues. In this sense, a reservoir simulator is just a specialized CFD program: it deals with the Navier-Stokes equations, and in addition with multi-phase flow, convection and diffusion, chemical changes, heat transfer, etc. So far as numerical methods go, there is naturally a large overlap between CFD and reservoir simulation. CFD programs typically discretize the problem domain—often using the finite element or finite volume method—and this leads to the need to solve large sparse linear equations. CFD programs often use generalized meshes, and this complicates the application of MPNF in those models. Many current CFD programs use Krylov subspace methods similar to those used in reservoir simulators.

Ground-water modelling is quite similar to oil reservoir simulation, but involves water rather than hydrocarbons. Salinity and/or chemical impurities may also be variables, and the model may also deal with ground subsidence, land drainage and irrigation. However as with an oil reservoir simulator, the flow domain is discretized using a rectangular or other mesh, which leads to matrices of the type that can be approximated effectively by MPNF.

Weather Forecasting and Climate Modelling Programs can, like reservoir simulators, be regarded as specialized CFD applications. Different models use different methods to solve the mathematical equations which model weather and climate dynamics. Some, including many regional models used for detailed short-term forecasts, use a finite difference method to discretize a three dimensional section of the atmosphere. This leads to a matrix which can be cast in the form that MPNF approximates.

It will be appreciated that embodiments of the present invention described herein may be implemented using of one or more conventional processors and unique stored program instructions that control the one or more processors to implement, in conjunction with certain non-processor circuits, some, most, or all of the functions of the techniques described herein. The non-processor circuits may include, but are not limited to, a transceiver, signal drivers, clock circuits and power source circuits. As such, these functions may be interpreted as steps of a method for searching information described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

I claim:

1. A hardware implemented method comprising:
estimating a physical state of a fluid reservoir with known physical characteristics, the estimating including creating an ordering of grid blocks for a parallel processing preconditioner, the creating including causing a processor to carry out the steps of:
   reading data describing one or more models of the fluid reservoir;
   defining a mesh of grid blocks based on the data, that represents a problem domain to be solved by an iterative method which uses the parallel processing preconditioner;
   determining a dominant direction for the mesh of grid blocks;
   defining a plurality of kernels having a color-based, non-planar organization, each kernel comprising matrix elements having connections within one or more adjacent lines of the grid blocks oriented along the dominant direction, including:
      determining how many lines are included in each kernel and how the lines are arranged within each kernel;
      determining at least two colors as color designations, wherein increasing a number of lines in a kernel or increasing a number of colors used produces a more accurate preconditioner and decreases a number of kernels that can be executed simultaneously; and
      assigning one of the color designations to each kernel, wherein an assembly of kernels of a given color forms a non-contiguous, non-planar structure and no adjacent kernels have a same color, except kernels adjacent to kernels of each available color;
   defining an order of processing by:
      defining an ordering from a first color to a last color;
      defining an ordering for the processing of each kernel within each color, including processing kernels of a given color in parallel;
      defining an ordering of grid blocks within each kernel along the dominant direction from one end of the kernel to another end of the kernel;
   adding one or more values from each corresponding grid block to a mathematical matrix in the defined order;
   generating the preconditioner based on the adding of one or more values from the grid blocks, the preconditioner comprising a mathematical preconditioning matrix that approximates an actual mathematical matrix and includes terms that are ordered by reference to the color assigned to each kernel and component grid blocks of each kernel; and
   predicting a current and/or a future physical state of the fluid reservoir based on processing the mathematical preconditioning matrix while maintaining a non-planar spatial organization of the kernels.

2. The method of claim 1, further comprising:
pre-calculating terms of the preconditioning matrix, the procedure comprising:
selecting a method for factorizing and solving kernels of the preconditioning matrix, wherein each kernel is assigned to one or more processors;
selecting a first color for a subset of the kernels;
factorizing each of the kernels that comprise the selected color subset using the method selected while maintaining the non-planar spatial organization of the kernels;
calculating a correction for kernels which have not yet been factorized using the factorized kernels;
selecting a next color for a subset of the kernels; and
repeating the factorizing, calculating, and selecting steps until each kernel has been factorized.

3. The method of claim 2, wherein selecting the method for factorizing and solving the kernels of the matrix comprises selecting at least one of the following methods:
a Thomas's algorithm, a Recursive Doubling algorithm, or a Cyclic Reduction algorithm.

4. The method of claim 2, wherein the correction calculated for kernels which have not yet been factorized comprises at least one of the following:
a diagonal matrix formed by summing elements of an error matrix in columns, wherein the error matrix comprises a matrix of differences between the actual matrix and the preconditioning matrix, a diagonal matrix formed by summing elements of the error matrix in rows, a diagonal matrix formed by dropping off-diagonal elements of the error matrix, a null correction, or any of these matrices scaled using a relaxation factor.

5. The method of claim 2, wherein the factorizing of the kernels that comprise the selected color, and the calculating of a correction for kernels which have not yet been factorized, is performed using one or more processors operating in parallel, the processors being either within a single computer system, or within multiple connected computer systems.

6. The method of claim 1, further comprising:
utilizing the preconditioning matrix, comprising a Massively Parallel Nested Factorisation (MPNF) preconditioning matrix having a plurality of kernels, to create an approximate solution to a system of linear equations comprising the actual mathematical matrix and an initial residual vector, using forward and backward sweeps through a predefined set of colors that are used to characterize the preconditioning matrix,
the forward sweep comprising:
   selecting a colored subset of the kernels of the preconditioning matrix not previously selected in the forward sweep,
   solving equations corresponding to each of the kernels that comprise the selected colored subset, to obtain corresponding parts of an intermediate solution,
   computing a correction to the equations for all unprocessed colored subsets of kernels using the newly computed intermediate solution, and
   repeating the selecting, solving, and computing steps for each unprocessed color subset until no more unprocessed colored subsets of kernels remain;
   setting an actual solution for a last colored subset of kernels processed in the forward sweep to the intermediate solution;
and the backward sweep comprising:
   computing a correction to equations for all colored subsets not yet selected in the backward sweep, using parts of the actual solution which have been computed in a preceding step;
   selecting a next colored subset of kernels not previously selected in the backward sweep or in setting the actual solution for the last colored subset of kernels processed in the forward sweep to the intermediate solution, the colored subsets being selected in a reverse order from an order of the forward sweep;

solving equations corresponding to each of the kernels that comprise the selected colored subset, to obtain corresponding parts of an actual solution, wherein each kernel is assigned to one or more processors; and repeating the computing, selecting a next colored subset, and solving steps of the backward sweep until all parts of the actual solution have been computed.

7. The method of claim 6, wherein the solving each of the kernels that comprise a selected color and the computing of corrections to the equations for all colored subsets not yet selected is performed using one or more processors operating in parallel, the processors being either within a single computer system or within multiple connected computer systems, and where data may be transferred between the one or more processors to implement the computing of corrections to the equations during the forward and backward sweeps.

8. The method of claim 7, wherein at least one of the transfers of data between processors are omitted on one or more iterations, when omitting the at least one of the transfers reduces delays which result from passing data between processors or connected computer systems.

9. A hardware implemented procedure comprising:

estimating a physical state of a fluid reservoir with known physical characteristics, the estimating including ordering a mathematical preconditioner matrix, which approximates an actual mathematical matrix, the ordering including causing a processor to carry out the steps of:

reading data describing one or more models of the fluid reservoir;

defining a mesh of grid blocks based on the data, that represents a problem domain to be solved using the preconditioner matrix;

determining a dominant direction for the mesh of grid blocks;

defining a plurality of kernels having a color-based, non-planar spatial organization, wherein an assembly of kernels of a given color forms a non-contiguous, non-planar structure and no adjacent kernels have a same color, except kernels adjacent to kernels of each available color, each kernel comprising matrix elements having connections within one or more adjacent lines of the grid blocks oriented along the dominant direction;

determining how many lines are included in each kernel and how the lines are arranged within each kernel;

selecting a two dimensional mesh grid comprising identifiers for the kernels, but, for the purpose of selecting, ignoring connections along the dominant direction;

setting up a repeating color sequence, having at least two colors, that specifies an order in which colors are to be assigned to kernels, in the two dimensional mesh grid;

setting one or more non-adjacent kernels to a first color of the color sequence;

creating a kernel candidate list, comprising kernels that have not been assigned any color, but that are adjacent to at least one kernel that has been assigned a color;

sorting the candidate list based on a number of different colors in adjacent kernels for each kernel and in order of decreasing numbers of different colors in adjacent kernels;

selecting a next color from the color sequence;

assigning the selected color to kernels in the sorted candidate list starting with the kernel with a highest number of different colors in adjacent kernels, such that no adjacent kernels are assigned a same color, except kernels adjacent to kernels of each available color, wherein increasing a number of lines in a kernel or increasing a number of colors used produces a more accurate preconditioner and decreases a number of kernels that can be executed simultaneously;

repeating the creating, sorting, selecting, and assigning steps until all kernels are colored assigned a color;

defining an order of processing by:

defining an ordering from a first color to a last color;

defining an ordering for the processing of each kernel within each color, including processing kernels of a given color in parallel;

defining an ordering of grid blocks within each kernel along the dominant direction from one end of the kernel to another end of the kernel:

adding one or more values from each corresponding grid block to a mathematical matrix in the defined order;

generating a mathematical preconditioner matrix, based on the adding of one or more values from the grid blocks, in which equations and variables are ordered by reference to the color assigned to each kernel and to component grid blocks of each kernel; and predicting a current and/or a future physical state of the fluid reservoir based on processing the mathematical preconditioner matrix while maintaining a non-planar spatial organization of the kernels.

10. The hardware implemented procedure of claim 9, wherein the sequence that specifies the order in which colors are to be assigned is cyclical.

11. The hardware implemented procedure of claim 9, wherein the sequence that specifies the order in which colors are to be assigned is oscillatory and three or more colors are assigned to the kernels.

12. The hardware implemented procedure of claim 9, wherein adjacent kernels are assigned the same color when a kernel in the candidate list already has neighboring kernels of every available color.

13. The hardware implemented procedure of claim 9, wherein the mesh of grid blocks is unstructured in two dimensions and has a regular structure in a third dimension.

14. The hardware implemented procedure of claim 9, further comprising solving each of the kernels that comprise a color using one or more processors operating in parallel while maintaining the non-planar spatial organization of the kernels, the processors being either within a single computer system, or within multiple connected computer systems.

15. The hardware implemented procedure of claim 9, further comprising utilizing the preconditioner matrix with a forward sweep and a backward sweep to converge to a solution, wherein the forward sweep comprises:

selecting a color subset of the kernels of the preconditioning matrix not previously selected in the forward sweep, solving equations corresponding to each of the kernels that comprise the selected color, to obtain a corresponding portion of an intermediate solution, computing a correction to the equations for all unprocessed colored subset of kernels using the intermediate solution, and repeating the selecting, solving, and computing steps for each unprocessed colored subset of kernels until no more unprocessed color subsets of kernels remain;

setting an actual solution for a last color subset of kernels processed in the forward sweep to the intermediate solution;

and the backward sweep comprising:
  computing a correction to equations for all color subsets of kernels not yet selected in the backward sweep, using parts of the actual solution which have been computed in a preceding step;
  selecting a next color subset of kernels not previously selected in the backward sweep or in setting the actual solution for the last colored subset of kernels processed in the forward sweep to the intermediate solution, the color subsets being selected in a reverse order from an order of the forward sweep;
  solving equations corresponding to each of the kernels that comprise the selected color subset of kernels, to obtain a corresponding part of the actual solution; and
  repeating the computing, selecting a next colored subset, and solving steps of the backward sweep until all parts of the actual solution have been computed.

* * * * *